(12) United States Patent
Oguri et al.

(10) Patent No.: US 12,486,455 B2
(45) Date of Patent: Dec. 2, 2025

(54) CERAMIC COMPLEX, LIGHT EMITTING DEVICE, AND METHOD FOR PRODUCING CERAMIC COMPLEX

(71) Applicant: NICHIA CORPORATION, Anan (JP)

(72) Inventors: Hirofumi Oguri, Komatsushima (JP); Toshiyuki Hirai, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 897 days.

(21) Appl. No.: 17/643,746

(22) Filed: Dec. 10, 2021

(65) Prior Publication Data

US 2022/0186117 A1 Jun. 16, 2022

(30) Foreign Application Priority Data

Dec. 11, 2020 (JP) ................. 2020-205735

(51) Int. Cl.
| | |
|---|---|
| C09K 11/02 | (2006.01) |
| C04B 35/117 | (2006.01) |
| C04B 35/64 | (2006.01) |
| C09K 11/77 | (2006.01) |
| H10H 20/851 | (2025.01) |
| H10H 20/856 | (2025.01) |

(52) U.S. Cl.
CPC ........ C09K 11/7774 (2013.01); C04B 35/117 (2013.01); C04B 35/64 (2013.01); C09K 11/02 (2013.01); H10H 20/8512 (2025.01); H10H 20/856 (2025.01); C04B 2235/3222 (2013.01); C04B 2235/656 (2013.01); C04B 2235/786 (2013.01); C04B 2235/9661 (2013.01)

(58) Field of Classification Search
CPC ... C09K 11/7774; C09K 11/02; C04B 35/117; C04B 35/64; C04B 2235/3222; C04B 2235/656; C04B 2235/786; H01L 33/502; H01L 33/60

See application file for complete search history.

(56) References Cited

U.S. PATENT DOCUMENTS

| | | | |
|---|---|---|---|
| 8,883,116 B2 | 11/2014 | Bonneau | |
| 9,045,691 B2 | 6/2015 | Irie | |
| 9,416,309 B2 | 8/2016 | Bonneau | |
| 9,605,201 B2 | 3/2017 | Yamaguchi | |
| 9,868,270 B2 | 1/2018 | Irie | |
| 10,665,761 B2 | 5/2020 | Moteki et al. | |
| 11,851,375 B2 * | 12/2023 | Hirai | C09K 11/7774 |
| 2010/0213822 A1 | 8/2010 | Shimooka et al. | |
| 2012/0012791 A1 | 1/2012 | Bonneau | |
| 2012/0045634 A1 | 2/2012 | Irie et al. | |
| 2013/0256599 A1 | 10/2013 | Irie | |
| 2014/0131753 A1 | 5/2014 | Ishida et al. | |
| 2015/0021423 A1 | 1/2015 | Bonneau | |
| 2015/0219291 A1 | 8/2015 | Yamaguchi | |
| 2015/0299566 A1 * | 10/2015 | Kinoshita | C09K 11/7774 252/301.36 |
| 2015/0340577 A1 | 11/2015 | Ishida et al. | |
| 2017/0088774 A1 | 3/2017 | Asai et al. | |
| 2017/0186920 A1 | 6/2017 | Kumano et al. | |
| 2018/0244986 A1 | 8/2018 | Yanagihara et al. | |
| 2019/0198726 A1 | 6/2019 | Moteki et al. | |
| 2019/0309221 A1 * | 10/2019 | Ooguri | C09K 11/7792 |
| 2019/0309223 A1 * | 10/2019 | Sunagawa | G03B 21/204 |
| 2020/0181487 A1 | 6/2020 | Kondo et al. | |
| 2020/0264499 A1 | 8/2020 | Arakawa | |
| 2020/0392401 A1 | 12/2020 | Ito et al. | |
| 2021/0246367 A1 | 8/2021 | Takaku et al. | |
| 2021/0403382 A1 | 12/2021 | Hirai et al. | |

FOREIGN PATENT DOCUMENTS

| | | |
|---|---|---|
| JP | H06122551 A | 5/1994 |
| JP | 2009263610 A | 11/2009 |
| JP | 2012520818 A | 9/2012 |
| JP | 2013227481 A | 11/2013 |
| JP | 2014112635 A | 6/2014 |
| JP | 2014132084 A | 7/2014 |
| JP | 2014181288 A | 9/2014 |

(Continued)

OTHER PUBLICATIONS

Cozzan, C., et al. "Stable, Heat-Conducting Phospor Composites for High-Power Laser Lighting", (Feb. 5, 2018), vol. 10, No. 6, Applied Materials & Interfaces, p. 5673-5681, 10 pages.

Final Office Action, United States Patent and Trademark Office, issued to U.S. Appl. No. 16/374,244 on Jul. 9, 2021, 6 pages.

Li, S., et al. "$Al_2O_3$—YAG:Ce composite phosphor ceramic: a thermally robust and efficient color converter for solid state laser lighting", (Oct. 2019), vol. 4, No. 37, Journal of Materials Chemistry C, p. 8648-8654, 8 pages.

(Continued)

*Primary Examiner* — Jane L Stanley

(74) *Attorney, Agent, or Firm* — Hunton Andrews Kurth LLP

(57) ABSTRACT

A ceramic complex including a first crystal phase containing a first rare earth aluminate fluorescent material containing an activating element and a first rare earth element that is different from the activating element, and a second crystal phase containing aluminum oxide, having a content of the first crystal phase in a range of 5% by volume or more and 40% by volume or less and a content of the second crystal phase in a range of 57% by volume or more and 95% by volume or less based on a total amount of the ceramic complex, having an average value of a second crystal diameter of the second crystal phase measured under the particular measurement condition of 12 μm or less, and having a QD value of 0.5 or less expressed by $QD=(D_{75}-D_{25})/(D_{75}+D_{25})$, wherein $D_{25}$ and $D_{75}$ are defined in the disclosure.

6 Claims, 14 Drawing Sheets

(56) References Cited

FOREIGN PATENT DOCUMENTS

| | | | |
|---|---|---|---|
| JP | 2014234487 | A | 12/2014 |
| JP | 2015149394 | A | 8/2015 |
| JP | 2016204561 | A | 12/2016 |
| JP | 2016204563 | A | 12/2016 |
| JP | 2017117912 | A | 6/2017 |
| JP | 2018077463 | A | 5/2018 |
| JP | 2019028306 | A | 2/2019 |
| JP | 2019182730 | A | 10/2019 |
| JP | 2020090424 | A | 6/2020 |
| JP | 2020132847 | A | 8/2020 |
| WO | 2020/013016 | A1 | 1/2001 |
| WO | 2006097876 | A1 | 9/2006 |
| WO | 2015141711 | A1 | 9/2015 |
| WO | 2018154869 | A1 | 8/2018 |

OTHER PUBLICATIONS

Non-Final Office Action, United States Patent and Trademark Office, issued to U.S. Appl. No. 16/374,244 on Mar. 26, 2021, 6 pages.
Non-Final Office Action, United States Patent and Trademark Office, issued to U.S. Appl. No. 17/304,956 on Apr. 10, 2023, 7 pages.
Notice of Allowance, United States Patent and Trademark Office, issued to U.S. Appl. No. 16/374,244 on Sep. 1, 2021, 5 pages.
Notice of Allowance, United States Patent and Trademark Office, issued to U.S. Appl. No. 17/304,956 on Aug. 11, 2023, 5 pages.
USPTO, Non-Final Office Action issued in related case U.S. Appl. No. 18/507,047 issued Aug. 12, 2025 (10 pages).

* cited by examiner

CERAMIC COMPLEX, LIGHT EMITTING DEVICE, AND METHOD FOR PRODUCING CERAMIC COMPLEX

CROSS-REFERENCE TO RELATED PATENT APPLICATION

This application claims priority to Japanese Patent Application No. 2020-205735, filed on Dec. 11, 2020, the disclosure of which is hereby incorporated by reference in its entirety.

BACKGROUND

Technical Field

The present disclosure relates to a ceramic complex, a light emitting device, and a method for producing a ceramic complex.

Description of Related Art

There is known a light emitting device comprising a light emitting diode (LED) or a laser diode (LD) and a wavelength conversion member including a fluorescent material for converting the wavelength of light emitted from a light emitting element such as an LED or LD. Such a light emitting device is used for applications such as on-vehicle lighting, general-purpose lighting, backlight of liquid crystal display devices, and light sources for projectors. In this specification, the "fluorescent material" is used in the same meaning as a "fluorescent phosphor".

For example, Japanese Unexamined Patent Publication No. 2015-149394 discloses a ceramic complex including a Ce-activated yttrium-aluminum-garnet fluorescent material, an inorganic material composed of aluminum oxide existing between fluorescent material particles, and additive particles having a particles diameter smaller than that of the fluorescent material particles adhered to cover at least a part of the surface of the fluorescent material particles.

Ceramic complexes including a fluorescent material and a translucent inorganic material is demanded to have a suppressed fluctuation in color tone of light emitted from the ceramic complex.

Thus, an aspect of the present disclosure can obtain a ceramic complex that is capable of suppressing the fluctuation in color tone of emitted light, a light emitting device using the ceramic complex, and a method for producing the ceramic complex.

SUMMARY

A first embodiment of the present disclosure relates to a ceramic complex including a first crystal phase that contains a first rare earth aluminate fluorescent material containing an activating element and a first rare earth element different from the activating element, and a second crystal phase containing aluminum oxide, having a content of the first crystal phase in a range of 5% by volume or more and 40% by volume or less and a content of the second crystal phase in a range of 57% by volume or more and 95% by volume or less based on a total amount of the ceramic complex, having an average value of a second crystal diameter of the second crystal phase measured under the following measurement condition of 12 μm or less, and having a QD value of 0.5 or less expressed by $QD=(D_{75}-D_{25})/(D_{75}+D_{25})$, wherein $D_{25}$ and $D_{75}$ represent values of the second crystal diameter at cumulative values from a small diameter side of a particle diameter distribution curve of the second crystal diameter of 25% and 75%, respectively, measurement condition:

in a scanning electron microscope (SEM) image of a cross section of the ceramic complex obtained with a scanning electron microscope, a maximum width of the crystal phase delimited by a grain boundary on the cross section and a minimum width passing a center point of the maximum width are measured, an average of the maximum width and the minimum width is designated as a crystal diameter, and an arithmetic average value of the crystal diameters in a specific size area in the SEM images with the same magnification is designated as the average value of the crystal diameter.

A second embodiment of the present disclosure relates to a light emitting device including a wavelength conversion member containing the ceramic complex, and an excitation light source.

A third embodiment of the present disclosure relates to a method for producing a ceramic complex, including: preparing a raw material mixture containing first rare earth aluminate fluorescent material particles that contains an activating element and a first rare earth element different from the activating element, and aluminum oxide particles; preparing a molded body by molding the raw material mixture; and obtaining a sintered body by calcining the molded body in at a temperature range of 1,550° C. or higher and 1,800° C. or lower, the raw material mixture having a content of the first rare earth aluminate fluorescent material particles in a range of 5% by mass or more and 40% by mass or less, and a content of the aluminum oxide particles in a range of 57% by mass or more and 95% by mass or less, based on a total amount of the raw material mixture, and the sintered body including a first crystal phase containing the first rare earth aluminate fluorescent material particles and a second crystal phase containing the aluminum oxide particles, having an average value of a second crystal diameter of the second crystal phase included in the sintered body measured under the aforementioned measurement condition of 12 μm or less, and having a QD value of 0.5 or less expressed by $QD=(D_{75}-D_{25})/(D_{75}+D_{25})$, wherein $D_{25}$ and $D_{75}$ represent values of the second crystal diameter at cumulative values from the small diameter side of the crystal diameter distribution curve of the second crystal diameter of 25% and 75% respectively.

According to embodiments of the present disclosure, a ceramic complex that is capable of suppressing the fluctuation in color tone of emitted light, a light emitting device using the ceramic complex, and a method for producing the ceramic complex can be provided.

DETAILED DESCRIPTION

Figure 1:
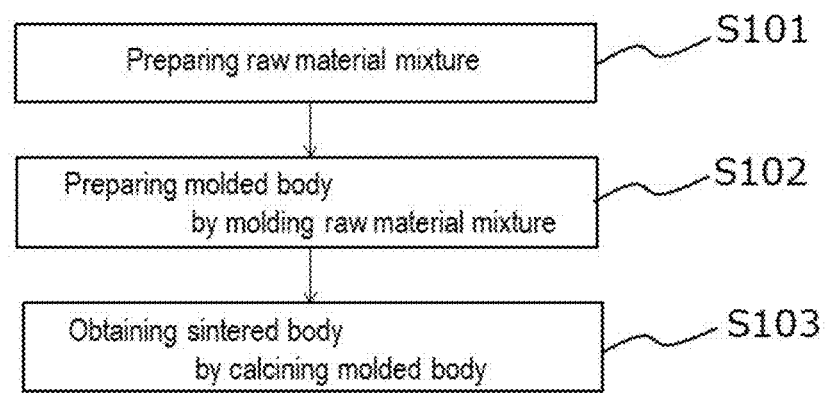
FIG. 1 is a flowchart describing an exemplary method for producing a ceramic complex according to a first embodiment of the present disclosure.

The ceramic complex, the light emitting device, and the method for producing a ceramic complex will be hereunder described on the basis of embodiments. The embodiments described below are exemplifications for embodying the technical idea of the present disclosure, and the present disclosure is not limited to the following ceramic complexes, the light emitting devices, and the methods for producing a ceramic complex shown below. The relationships between the color names chromaticity coordinates, and the relationships between wavelength ranges of light and the color names of monochromic light are in accordance with Japanese Industrial Standard (JIS) Z8110. In the specification ceramics refers to any inorganic non-metallic material at a temperature of 1,000° C. or lower.

Ceramic Complex

The ceramic complex includes a first crystal phase that contains a first rare earth aluminate fluorescent material containing an activating element and a first rare earth element different from the activating element, and a second crystal phase containing aluminum oxide, has a content of the first crystal phase in a range of 5% by volume or more and 40% by volume or less and a content of the second crystal phase in a range of 57% by volume or more and 95% by volume or less based on a total amount of the ceramic complex, has an average value of a second crystalline diameter of the second crystal phase measured under the following measurement condition of 12 μm or less, and has a QD value of 0.5 or less expressed by $QD=(D_{75}-D_{25})/(D_{75}+D_{25})$, wherein $D_{25}$ and $D_{75}$ represent values of the second crystal diameter at cumulative values from the small diameter side of the particle diameter distribution curve of the second crystal diameter of 25% and 75% respectively. The particle diameter distribution curve of the second crystal diameter is a distribution curve of the crystal diameter measured under the following condition under an assumption that one of the second crystal phase delimited by a grain boundary is one particle.

Measurement Condition:

In a scanning electron microscope (SEM) image of a cross section of the ceramic complex obtained with a scanning electron microscope, a maximum width of the crystal phase delimited by a grain boundary on the cross section and a minimum width passing a center point of the maximum width are measured, an average of the maximum width and the minimum width is designated as a crystal diameter, and an arithmetic average value of the crystal diameters in a specific size area in the SEM images with the same magnification is designated as the average value of the crystal diameter.

First Crystal Phase

The content of the first crystal phase containing the first rare earth aluminate fluorescent material in the ceramic complex is in a range of 5% by volume or more and 40% by volume or less, preferably 6% by volume or more and 38% by volume or less, and more preferably 7% by volume or more and 35% by volume or less. The ceramic complex can convert the wavelength of the incident light with the first rare earth aluminate fluorescent material in the first crystal phase containing the first rare earth aluminate fluorescent material, and can emit the light having the converted wavelength. In the case where the content of the first crystal phase containing the first rare earth aluminate fluorescent material included in the ceramic complex is in a range of 5% by volume or more and 40% by volume or less, the wavelength of the incident light can be efficiently converted with the first crystal phase containing the first rare earth aluminate fluorescent material, and the light can be efficiently scattered with the second crystal phase as the matrix, resulting in light having color tone with suppressed fluctuation emitted from the ceramic complex.

The content (% by volume) of the first crystal phase and the content (% by volume) of the second crystal phase in the ceramic complex can be obtained in such a manner that SEM photographs of cross sections at arbitrary several positions of the ceramic complex are taken with a scanning electron microscope (SEM), the volume proportions of the first crystal phase and the second crystal phase are calculated from the SEM photographs, and the contents are calculated from the average values of the volume proportions of the first crystal phase and the second crystal phase on the cross sections at the several positions.

The content (% by volume) of the first crystal phase and the content (% by volume) of the second crystal phase in the ceramic complex can be calculated from the content in terms of mass proportion and the true density of the first rare earth aluminate fluorescent material particles in the raw material mixture constituting the ceramic complex, and the true density of the aluminum oxide particles.

Content (% by Volume) of First Crystal Phase

The content of the first crystal phase in the ceramic complex can be calculated according to the following expression (1). The mass proportion (% by mass) of the first rare earth aluminate fluorescent material particles in the following expression (1) is the mass proportion of the first rare earth aluminate fluorescent material particles in the raw material mixture.

$$\text{First crystal phase (\% by volume)} = \frac{(P1_m \div P1_d)}{(P1_m \div P1_d) + \{(100 - P1_m) \div P2_d\}} \times 100 \quad (1)$$

Mass ratio (% by mass) of first crystal phase (first rare earth aluminate fluorescent material particles): $P1_m$ True density (g/cm$^3$) of first crystal phase (first rare earth aluminate fluorescent material particles): $P1_d$ True density (g/cm$^3$) of second crystal phase (aluminum oxide particles): $P2_d$ The first crystal diameter of the first crystal phase included in the ceramic complex may be in a range of 5 μm or more and 40 μm or less, may be in a range of 8 μm or more and 35 μm or less, and may be in a range of 10 μm or more and 30 μm or less. In the case where the first crystal diameter of the first crystal phase containing the first rare earth aluminate fluorescent material is in a range of 5 μm or more and 40 μm or less, the ceramic complex can emit mixed light of the light having the wavelength efficiently converted through absorption of the light incident on the ceramic complex by the first rare earth aluminate fluorescent material contained in the first crystal phase and the light transmitted through the ceramic complex. The first crystal phase containing the first rare earth aluminate fluorescent material absorbs light emitted from the excitation light source and converts the wavelength of the light, and the ceramic complex can emit light having a high luminance. The first crystal diameter of the first crystal phase may be in a range of 8 μm or more and 35 μm or less, and may be in a range of 10 μm or more and 30 μm or less.

Second Crystal Phase

Aluminum oxide contained in the second crystal phase of the ceramic complex is melted by heat in the formation of the ceramic complex, and the aluminum oxide particles contained in the raw material mixture are bound to each other to form the second crystal phase containing aluminum oxide. The second crystal phase containing aluminum oxide included in the ceramic complex transmits light exciting the first rare earth aluminate fluorescent material. In the case where the second crystal diameter of the second crystal phase is increased, the color tone difference between the light transmitting through the second crystal phase and the light having a wavelength converted with the first rare earth aluminate fluorescent material contained in the first crystal phase is increased, and the fluctuation in color tone of the light emitted from the ceramic complex is increased. In the case where the average particle diameter of the second crystal diameter of the second crystal phase is 12 μm or less, and the QD value thereof is 0.5 or less, the second crystal diameter of the second crystal phase is relatively small, and the particle diameter distribution assuming that the second crystal phase is constituted by particles becomes narrow, i.e., the diameters of the second crystal phase are uniform. Accordingly, the light incident on the ceramic complex is scattered at the grain boundary of the second crystal phase, and the fluctuation in color tone of the light emitted from the ceramic complex can be suppressed.

The average value of the second crystal diameter of the second crystal phase measured under the aforementioned condition is 12 μm or less, may be 11.95 μm or less, may be 11.94 μm or less, and may be 11.93 μm or less. The second crystal diameter of the second crystal phase containing aluminum oxide may vary depending on the production condition even in the case where aluminum oxide having the same diameter is used as the raw material. The second crystal diameter of the second crystal phase may be 3 μm or more, may be 4 μm or more, and may be 5 μm or more.

In the case where the average value of the second crystal diameter is 12 μm or less, and the particle diameter distribution is narrow, i.e., the diameters thereof are uniform, the light incident on the ceramic complex can be readily scattered uniformly, and the fluctuation in color tone can be readily suppressed. The QD value expressed by $QD=(D_{75}-D_{25})/(D_{75}+D_{25})$, wherein $D_{25}$ and $D_{75}$ represent values of the second crystal diameter at cumulative values from the small diameter side of the particle diameter distribution curve of the second crystal diameter of 25% and 75% respectively, is 0.5 or less, preferably 0.495 or less, more preferably 0.492 or less, and further preferably 0.490 or less. In the case where the QD value is smaller, the particle diameter distribution is narrower, and the crystal diameters are more uniform. The QD value of the second crystal diameter of the second crystal phase may be 0.400 or more, may be 0.420 or more, and may be 0.450 or more.

The content of the second crystal phase containing aluminum oxide in the ceramic complex is in a range of 57% by volume or more and 95% by volume or less, preferably in a range of 57% by volume or more and 94.99% by volume or less, more preferably in a range of 58% by volume or more and 94% by volume or less, and further preferably in a range of 60% by volume or more and 90% by volume or less. In the case where the ceramic complex includes a third crystal phase containing a second rare earth aluminate described later, the content of the second crystal phase is preferably in a range of 57% by volume or more and 94.9% by volume or less. The ceramic complex includes the second crystal phase containing aluminum oxide in an amount exceeding 50% by volume, and the second crystal phase constitutes the matrix of the ceramic complex. The wavelength of light incident on the ceramic complex is converted with the first crystal phase containing the first rare earth aluminate fluorescent material, and simultaneously the incident light is scattered with the second crystal phase. The diameter of the second crystal phase containing aluminum oxide constituting the matrix of the ceramic complex influences the color tone of the light emitted from the ceramic complex.

Content (% by Volume) of Second Crystal Phase.

The content of the second crystal phase in the ceramic complex can be calculated according to the following expression (2).

$$\text{Second crystal phase(\% by volume)}=100-\text{First crystal phase(\% by volume)}-\text{Third crystal phase(\% by volume)} \quad (2)$$

First Rare Earth Aluminate Fluorescent Material

It is preferred that the first rare earth aluminate fluorescent material contained in the first crystal phase contains a first rare earth element $Ln^1$ that comprises at least one selected from the group consisting of Y, Lu, Gd, and Tb, Ce serving as the activating element, and Al, and may optionally contain Ga, and has a composition of the first rare earth aluminate, in which the total molar ratio of the first rare earth element $Ln^1$ and Ce is 3; the molar ratio of Ce is a product of a parameter a in a range of more than 0 and 0.22 or less and 3; the total molar ratio of Al and Ga is in a range of 4.5 or more and 5.5 or less; the molar ratio of Al is a product of a parameter c in a range of more than 0 and 1.1 or less and 5; and the molar ratio of Ga that may be optionally contained is a product of a parameter b in a range of 0 or more and 0.4 or less and 5, from the standpoint of the achievement of light emission in the target color tone.

The first rare earth element $Ln^1$ contained in the first rare earth aluminate fluorescent material particles may contain two or more kinds of elements selected from the group consisting of Y, Lu, Gd, and Tb. The first rare earth element $Ln^1$ may be at least one kind selected from the group consisting of Y, Lu, and Gd. The first rare earth element $Ln^1$ may be Y and Gd, and may be Y and Lu. In the case where the first rare earth aluminate fluorescent material contains two or more kinds of rare earth elements as $Ln^1$, and $Ln^1$ is Y and Gd, the molar ratio of Y and Gd (Y/Gd) in the composition of the first rare earth aluminate fluorescent material is preferably in a range of 99.5:0.5 to 70:30, may be in a range of 99:1 to 80:20, and may be in a range of 99:1 to 90:10.

In the composition of the first rare earth aluminate fluorescent material particles, the molar ratio of Ce is expressed by the product of the parameter a and 3. In the composition of the first rare earth aluminate fluorescent material particles, the molar ratio of Ce is preferably in a range of more than 0 and 0.66 or less, may be in a range of 0.001 or more and 0.60 or less, may be in a range of 0.003 or more and 0.450 or less, may be in a range of 0.006 or more and 0.300 or less, may be in a range of 0.012 or more and 0.270 or less, and may be in a range of 0.015 or more and 0.240 or less. In the composition of the first rare earth aluminate fluorescent material particles, the parameter a is in a range of more than 0 and 0.22 or less ($0<a \leq 0.22$), may be in a range of 0.0003 or more and 0.20 or less, ($0.0003 \leq a \leq 0.20$), may be in a range of 0.001 or more and 0.150 or less, ($0.001 \leq a \leq 0.150$), may be in a range of 0.002 or more and 0.100 or less, ($0.002 \leq a \leq 0.100$), may be in a range of 0.004 or more and 0.090 or less, ($0.004 \leq a \leq 0.090$), and may be in a range of 0.005 or more and 0.080 or less, ($0.005 \leq a \leq 0.080$).

In the composition of the first rare earth aluminate fluorescent material particles, the molar ratio of Al is expressed by the product of the parameter c and 5. In the composition of the first rare earth aluminate fluorescent material particles, the molar ratio of Al is in a range of more than 0 and 5.5 or less, may be in a range of 0.54 or more and 5.0 or less, and may be in a range of 0.63 or more and 5.0 or less. In the composition of the first rare earth aluminate fluorescent material particles, the parameter c is in a range of more than 0 and 1.1 or less ($0<c \leq 1.1$), may be in a range of 0.6 or more and 1.0 or less ($0.6 \leq c \leq 1.0$), and may be in a range of 0.7 or more and 1.0 or less ($0.7 \leq c \leq 1.0$).

The composition of the first rare earth aluminate fluorescent material particles may not contain Ga. In the composition of the first rare earth aluminate fluorescent material particles, the molar ratio of Ga is expressed by the product of the parameter b and 5. In the composition of the first rare earth aluminate fluorescent material particles, the molar ratio of Ga is in a range of 0 or more and 2.0 or less, may be in a range of 0.1 or more and 1.5 or less, and may be in a range of 0.2 or more and 1.2 or less. In the composition of the first rare earth aluminate fluorescent material particles, the parameter b is in a range of 0 or more and 0.4 or less ($0 \leq b \leq 0.4$), may be in a range of 0.02 or more and 0.3 or less ($0.02 \leq b \leq 0.3$), and may be in a range of 0.04 or more and 0.24 or less ($0.04 \leq b \leq 0.24$).

In the composition of the first rare earth aluminate fluorescent material particles, the total molar ratio of Al and Ga is in a range of 4.5 or more and 5.5 or less, and may be 5.

In the composition of the first rare earth aluminate fluorescent material particles, the sum of the parameter b and the parameter c is in a range of 0.9 or more and 1.1 or less ($0.9 \leq b+c \leq 1.1$), and may be 1 (b+c=1).

The first rare earth aluminate fluorescent material preferably has a composition represented by the following formula (I):

$$(Ln^1_{1-a}Ce_a)_3(Al_cGa_b)_5O_{12} \qquad (I)$$

wherein $Ln^1$ represents at least one kind selected from the group consisting of Y, Gd, Lu, and Tb, and a, b, and c satisfy $0<a \leq 0.22$, $0 \leq b \leq 0.4$, $0<c \leq 1.1$, and $0.9 \leq b+c \leq 1.1$.

Third Crystal Phase

The ceramic complex may include a third crystal phase containing a second rare earth aluminate containing a second rare earth element. In the case where the raw material mixture contains second rare earth oxide particles containing the second rare earth element, the second rare earth oxide particles aggregate around the aluminum oxide particles in calcining the molded body, and the aluminum oxide particles and the second rare earth oxide particles are reacted with each other to form the third crystal phase containing the second rare earth aluminate. The crystal growth of aluminum oxide is suppressed by the reaction of the second rare earth oxide particles and the aluminum oxide particles, and thereby the second crystal diameter of the second crystal phase containing aluminum oxide is decreased, and the particle diameter distribution assuming that the second crystal phase is constituted by particles becomes narrow, resulting in the second crystal phase having a uniform diameter. With the reaction of the second rare earth oxide particles and the first rare earth aluminate fluorescent material particles, the second rare earth oxide particles and the first rare earth aluminate fluorescent material particles are integrated to each other without the formation of a grain boundary, so as to form the first crystal phase containing the first rare earth aluminate fluorescent material. In the case where the raw material mixture contains the first rare earth aluminate fluorescent material particles, the aluminum oxide particles, and the second rare earth oxide particles, the resulting ceramic complex has formed therein the first crystal phase containing the first rare earth aluminate fluorescent material, the second crystal phase containing aluminum oxide, and the third crystal phase containing the second rare earth aluminate.

The content of the third crystal phase in the ceramic complex may be in a range of 0% by volume or more and 3% by volume or less, based on a total amount of the ceramic complex. In the case where the ceramic complex includes the third crystal phase, the content of the third crystal phase is preferably in a range of 0.01% by volume or more and 3% by volume or less, may be in a range of 0.05% by volume or more and 2.5% by volume or less, and may be in a range of 0.1% by volume or more and 2% by volume or less, based on a total amount of the ceramic complex. In the case where the ceramic complex includes the third crystal phase, it is preferred that the content of the first crystal phase is in a range of 5% by volume or more and 40% by volume or less, the content of the second crystal phase is in a range of 57% by volume or more and 94.99% by volume or less, and the content of the third crystal phase is in a range of 0.01% by volume or more and 3% by volume or less. In the case where the ceramic complex includes the third crystal phase, it is preferred that the content of the first crystal phase is in a range of 5% by volume or more and 40% by volume or less, the content of the second crystal phase is in a range of 57.5% by volume or more and 94.95% by volume or less, and the content of the third crystal phase is in a range of 0.05% by volume or more and 2.5% by volume or less. In the case where the ceramic complex includes the third crystal phase, it is preferred that the content of the first crystal phase is in a range of 5% by volume or more and 40% by volume or less, the content of the second crystal phase is in a range of 58% by volume or more and 94.9% by volume or less, and the content of the third crystal phase is in a range of 0.1% by volume or more and 2.0% by volume or less.

Content (% by Volume) of Third Crystal Phase

The content of the third crystal phase in the ceramic complex can be calculated according to the following expression (3):

$$\text{Third crystal phase (\% by volume)} = \frac{(P3_m \div P3_d)}{(P3_m \div P3_d) + \{(100 - P3_m) \div P2_d\}} \times 100 \quad (3)$$

Mass ratio (% by mass) of third crystal phase (second rare earth aluminate): $P3_m$ True density (g/cm$^3$) of third crystal phase (second rare earth aluminate): $P3_d$ True density (g/cm$^3$) of second crystal phase (aluminum oxide particles): $P2_d$ The mass proportion (% by mass) of the third crystal phase in the ceramic complex can be calculated from the content (% by mass) in terms of mass proportion and the true density of the second rare earth oxide particles in the raw material mixture according to the following expressions (4) and (5):

Third crystal phase(% by mass) Oxide containing second rare earth element=in raw material mixture(% by mass)×K  (4)

K=(Molecular weight of oxide containing second rare earth element÷Molar number of second rare earth element)×(Molecular weight of second rare earth aluminate÷Molar number of second rare earth element)  (5)

Third Crystal Diameter of Third Crystal Phase

The third crystal diameter of the third crystal phase included in the ceramic complex is preferably in a range of 0.5 μm or more and 5 μm or less, may be 0.6 μm or more and 4 μm or less, and may be in a range of 0.7 μm or more and 3 μm or less, for suppressing the crystal growth of the second crystal phase containing aluminum oxide and forming the second crystal phase capable of uniformly scattering the incident light. The third crystal diameter of the third crystal phase may be measured under the aforementioned condition.

The second rare earth aluminate contained in the third crystal phase may contain at least one kind of the second rare earth element selected from the group consisting of Y, La, Pr, Nd, Pm, Sm, Eu, Gd, Tb, Dy, Ho, Er, Tm, Yb, and Lu. The second rare earth aluminate may contain at least one kind of a second rare earth element $Ln^2$ selected from the group consisting of Y, Gd, Tb, and Lu. The second rare earth aluminate may contain at least one kind of the second rare earth element $Ln^2$ selected from the group consisting of Y, Gd, Tb, and Lu, and Al, and may have a composition of the second rare earth aluminate, in which the molar ratio of the second rare earth element $Ln^2$ is 3, and the molar ratio of Al is 5. The second rare earth aluminate having this composition can suppress the crystal growth of the aluminum oxide particles, can decrease the average value of the second crystal diameter of the second crystal phase, and can decrease the QD value, so as to promote the formation of the second crystal phase having a narrow particle diameter distribution and a uniform crystal diameter.

The third crystal phase contains the second rare earth aluminate formed through reaction of aluminum oxide and the second rare earth oxide particles, and therefore the third crystal phase contains substantially no element capable of functioning as an activator. The matter that the third crystal phase contains substantially no element capable of functioning as an activator means that the content of an element capable of functioning as an activator contained in the third crystal phase is 200 ppm by mass or less. In the case where the activating element of the first rare earth aluminate fluorescent material contained in the first crystal phase is cerium (Ce), the content of cerium (Ce) in the third crystal phase is 200 ppm by mass or less. The content of the element capable of functioning as an activator in the third crystal phase containing the second rare earth aluminate can be obtained by measuring a cross section of the third crystal phase containing the second rare earth aluminate in the ceramic complex for the content of the element capable of functioning as an activator, such as cerium (Ce), in the third crystal phase by energy dispersive X-ray spectroscopy (EDX). The content of the element capable of functioning as an activator in the third crystal phase containing the second rare earth aluminate in the ceramic complex is 200 ppm by mass or less, may be 150 ppm by mass or less, may be 100 ppm by mass or less, may be the measurement limit of EDX or less, may be 0 ppm by mass, may be 0.1 ppm by mass or more, and may be 1 ppm by mass or more.

The second rare earth aluminate preferably has a composition represented by the following formula (II). In the case where the second rare earth aluminate contained in the third crystal phase is formed through reaction of the aluminum oxide particles and the second rare earth oxide particles, and the second rare earth element $Ln^2$ contained in the oxide particles is at least one kind selected from the group consisting of Y, Gd, Tb, and Lu, the third crystal phase containing the second rare earth aluminate having a composition represented by the following formula (II) is formed.

$$Ln^2{}_3Al_5O_{12} \quad (II)$$

wherein, $Ln^2$ represents at least one kind selected from the group consisting of Y, Gd, Tb, and Lu.

Relative Density

The relative density of the ceramic complex is preferably 98% or more. In the case where the relative density of the ceramic complex is 98% or more, light incident on the ceramic complex can be uniformly scattered with the second crystal phase constituting a matrix having a relatively small and uniform crystal diameter, and the wavelength of the light for emitting can be efficiently converted through absorption by the rare earth aluminate fluorescent material contained in the first crystal phase, resulting in suppressed fluctuation in color tone. The relative density of the ceramic complex may be 99% or more, may be 99.5% or more, may be 99.9% or more, and may be 100%.

The relative density of the ceramic complex can be calculated from the apparent density of the ceramic complex and the true density of the ceramic complex according to the following expression (6):

Relative density(%) of ceramic complex=(Apparent density of ceramic complex÷True density of ceramic complex)×100  (6)

The apparent density of the ceramic complex is a value obtained by dividing the mass of the ceramic complex by the volume of the ceramic complex, and can be calculated according to the following expression (7):

Apparent density(g/cm³) of ceramic complex=Mass (g) of ceramic complex÷Volume(cm³) of ceramic complex(Archimedes' method) (7)

In the case where the ceramic complex includes the first crystal phase and the second crystal phase, and does not include the third crystal phase, the true density of the ceramic complex can be calculated according to the following expression (8):

$$\text{True density (g/cm}^3\text{) of ceramic complex} = \frac{P1_d \times P2_d \times (P1_m + P2_m)}{(P2_d \times P1_m) + (P1_d \times P2_{m_d})} \quad (8)$$

Mass ratio (% by mass) of first crystal phase (first rare earth aluminate fluorescent material particles): $P1_m$
True density (g/cm³) of first crystal phase (first rare earth aluminate fluorescent material particles): $P1_d$
Mass ratio (% by mass) of second crystal phase (second rare earth aluminate): $P2_m$
True density (g/cm³) of second crystal phase (second rare earth aluminate): $P2_d$
$P1_m + P2_m = 100\%$ by mass In the case where the ceramic complex includes the first crystal phase, the second crystal phase, and the third crystal phase, the true density of the ceramic complex can be calculated according to the following expression (9). The content (% by mass) of the third crystal phase in the ceramic complex can be calculated according to the expressions (4) and (5) described above.

$$\text{True density (g/cm}^3\text{) of ceramic complex} = \frac{P1_d \times P2_d \times P3_d \times (P1_m + P2_m + P3_m)}{(P2_d \times P3_d \times P1_m) + (P1_d \times P3_d \times P2_m) + (P1_d \times P2_d \times P3_m)} \quad (9)$$

Mass ratio (% by mass) of first crystal phase (first rare earth aluminate fluorescent material particles): $P1_m$
True density (g/cm³) of first crystal phase (first rare earth illuminate fluorescent material particles): $P1_d$
Mass ratio (% by mass) of second crystal phase (second rare earth aluminate): $P2_m$
True density (g/cm³) of second crystal phase (second rare earth aluminate): $P2_d$
Mass ratio (% by mass) of third crystal phase (aluminum oxide particles): $P3_m$
True density (g/cm³) of third crystal phase (aluminum oxide particles): $P3_d$
$P1_m + P2_m + P3_m = 100\%$ by mass The relative densities, the apparent densities, and the true densities of the sintered body, the first sintered body, and the second sintered body obtained in the method for producing a ceramic complex can also be calculated according to the expressions (6) to (9) above after replacing the ceramic complex by the sintered body, the first sintered body, or the second sintered body.

Method for Producing Ceramic Complex

The method for producing a ceramic complex, includes: preparing a raw material mixture containing first rare earth aluminate fluorescent material particles containing an activating element and a first rare earth element that is different from the activating element, and aluminum oxide particles; preparing a molded body by molding the raw material mixture; and obtaining a sintered body by calcining the molded body at a temperature in a range of 1,550° C. or higher and 1,800° C. or lower, the raw material mixture has a content of the first rare earth aluminate fluorescent material particles in a range of 5% by mass or more and 40% by mass or less, and a content of the aluminum oxide particles in a range of 57% by mass or more and 95% by mass or less, based on a total amount of the raw material mixture, and the sintered body includes a first crystal phase containing the first rare earth aluminate fluorescent material particles and a second crystal phase containing the aluminum oxide particles, has an average value of a second crystal diameter of the second crystal phase contained in the sintered body measured under the aforementioned measurement condition of 12 µm or less, and has a QD value of 0.5 or less expressed by QD=($D_{75}$−$D_{25}$)/($D_{75}$+$D_{25}$), wherein $D_{25}$ and $D_{75}$ represent values of the second crystal diameter at cumulative values from the small diameter side of the particle diameter distribution curve of the second crystal diameter of 25% and 75% respectively.

FIG. 1 is a flowchart showing the first embodiment of the method for producing a ceramic complex. The process steps of the method for producing a ceramic complex will be described with reference to the drawings. As shown in FIG. 1, the method for producing a ceramic complex includes: a step S101 of preparing a raw material mixture containing first rare earth aluminate fluorescent material particles, aluminum oxide particles, and optionally second rare earth oxide particles containing a second rare earth element; a step S102 of obtaining a molded body by molding the raw material mixture; and a step S103 of obtaining a sintered body by calcining the molded body at a temperature in a range of 1,550° C. or higher and 1,800° C. or lower.

First Rare Earth Aluminate Fluorescent Material Particles

The first rare earth aluminate fluorescent material particles may be first rare earth aluminate fluorescent material that has the same composition as the first rare earth aluminate fluorescent material described above. It is preferred that the first rare earth aluminate fluorescent material particles contain a first rare earth element $Ln^1$ that comprises at least one kind selected from the group consisting of Y, Lu, Gd, and Tb, Ce as the activating element, and Al, and may optionally contain Ga, and has a composition of the first rare earth aluminate, in which the total molar ratio of the first rare earth element $Ln^1$ and Ce is 3; the molar ratio of Ce is a product of the parameter a in a range of more than 0 and 0.22 or less and 3; the total molar ratio of Al and Ga is in a range of 4.5 or more and 5.5 or less; the molar ratio of Al is a product of the parameter c in a range of more than 0 and 1.1 or less and 5; and the molar ratio of Ga that may be optionally contained, is a product of the parameter b in a range of 0 or more and 0.4 or less and 5, from the standpoint of the achievement of light emission in the target color tone. The first rare earth aluminate fluorescent material particles preferably have a composition represented by the formula (I) described above.

The first rare earth aluminate fluorescent material particles preferably have an average particle diameter measured by the Fisher Sub-Sieve Sizer method (which may be hereinafter referred to as the FSSS method) in a range of 4 µm or more and 40 µm or less, more preferably in a range of 5 µm or more and 35 µm or less, and further preferably in a range of 8 µm or more and 30 µm or less. The FSSS method is an air permeation method of obtaining mainly a primary particle diameter by measuring a specific surface area using a flow resistance of air. The average particle diameter measured by the FSSS method may be referred to as a Fisher Sub-Sieve Sizer's number. In the case where the average particle diameter of the first rare earth aluminate fluorescent material particles measured by the FSSS method is in a range of 4 µm or more and 40 µm or less, the ceramic complex including the first crystal phase having a first crystal diameter in a range of 5 µm or more and 40 µm or less can be produced.

Aluminum Oxide Particles

The aluminum oxide particles preferably have a purity of aluminum oxide purity of 99.0% by mass or more, and more preferably 99.5% by mass or more. When the aluminum oxide purity in the aluminum oxide particles is 99.0% by mass or more, impurities can be reduced, and a ceramic complex capable of emitting light with high luminance can be produced. For the aluminum oxide purity in the aluminum oxide particles can be referred to the value of the purity of aluminum oxide described in the brochure may be referred to. In the case where the aluminum oxide purity in the aluminum oxide particles is unknown, the purity of aluminum oxide particles can be measured in such a manner that the mass of the aluminum oxide particles is measured, the aluminum oxide particles are then calcined at 800° C. for 1 hour in an air atmosphere to eliminate organic materials or moisture attached to or adsorbed on the aluminum oxide particles, the mass of the aluminum oxide particles after calcining is measured, and the mass of the aluminum oxide particles after calcination is divided by the mass of the aluminum oxide particles before calcination.

The average particle diameter of the aluminum oxide particles measured by the FSSS method may be in a range of 0.1 µm or more and 1.5 µm or less, and may be in a range of 0.2 µm or more and 1.0 µm or less. In the second crystal phase containing aluminum oxide, there is a tendency that the second crystal diameter of the second crystal phase is changed by the condition in the production of the ceramic complex, rather than the diameter of the aluminum oxide particles as the raw material. For the particle diameter of the aluminum oxide particles, the value described in the brochure may be referred to.

Second Rare Earth Oxide Particles

In the step of preparing the raw material mixture, the raw material mixture may contain the second rare earth oxide particles containing the second rare earth element. In the case where the raw material mixture contains the second rare earth oxide particles, the second rare earth oxide particles and the aluminum oxide particles are readily reacted with each other in calcining the molded article described later, and the crystal growth of the aluminum oxide particles can be readily suppressed. By suppressing the crystal growth of the aluminum oxide particles, the second crystal diameter is decreased, and the particle diameter distribution assuming that the second crystal phase is constituted by particles becomes narrow, resulting in the ceramic complex including the second crystal phase containing aluminum oxide having a uniform diameter.

The second rare earth element contained in the second rare earth oxide particles is preferably an element that is different from the activating element contained in the first rare earth aluminate fluorescent material particles. Examples of the second rare earth element contained in the second rare earth oxide particles include at least one kind selected from the group consisting of Sc, Y, La, Pr, Nd, Pm, Sm, Eu, Gd, Tb, Dy, Ho, Er, Tm, Yb, and Lu. The second rare earth element contained in the second rare earth oxide particles is preferably at least one kind selected from the group consisting of Y, La, Nd, Pm, Gd, Tb, Dy, Ho, Er, Yb, and Lu, and more preferably at least one kind selected from the group consisting of Y, La, Nd, Gd, Tb, Yb, and Lu. The second rare earth oxide particles further preferably contain at least one kind of the second rare earth element $Ln^2$ selected from the group consisting of Y, Gd, Tb, and Lu. Specifically, the second rare earth oxide particles are preferably at least one kind selected from the group consisting of $Y_2O_3$, $La_2O_3$, $Pr_7O_{11}$, $Nd_2O_3$, $Gd_2O_3$, $Tb_4O_7$, $Yb_2O_3$, and $Lu_2O_3$. The second rare earth oxide particles are more preferably at least one kind selected from the group consisting of $Y_2O_3$, $La_2O_3$, $Nd_2O_3$, $Gd_2O_3$, $Tb_4O_7$, $Yb_2O_3$, and $Lu_2O_3$, and further preferably at least one kind selected from the group consisting of $Y_2O_3$, $Gd_2O_3$, $Tb_4O_7$, and $Lu_2O_3$. For the second rare earth oxide particles, one kind thereof may be used alone, or two or more kinds thereof may be used in combination. The second rare earth oxide particles may contain no aluminum. The oxide particles containing no aluminum means oxide particles having a content of aluminum of less than 1% by mass.

The average particle diameter of the second rare earth oxide particles measured by the FSSS method is preferably in a range of 0.05 µm or more and less than 5 µm, and more preferably in a range of 0.1 µm or more and 4 µm or less. In the case where the average particle diameter of the second rare earth oxide particles is in a range of 0.05 µm or more and less than 5 µm, the second rare earth oxide particles and the aluminum oxide particles can be readily reacted with each other in calcining the molded article described later, and the crystal growth of the aluminum oxide particles can be readily suppressed.

Raw Material Mixture

The raw material mixture has a content of the first rare earth aluminate fluorescent material particles in a range of 5% by mass or more and 40% by mass or less, and a content of the aluminum oxide particles in a range of 57% by mass or more and 95% by mass or less, based on a total amount thereof. In the case where the content of the first rare earth aluminate fluorescent material particles and the content of the aluminum oxide particles in the raw material mixture are in the aforementioned ranges, the ceramic complex capable of providing light emission in the target color tone through irradiation of excitation light can be produced.

The total amount of the raw material mixture may be the total amount of the first rare earth aluminate fluorescent material particles and the aluminum oxide particles. In the case where the raw material mixture contains the first rare earth aluminate fluorescent material particles and the aluminum oxide particles, but does not contain the second rare earth oxide particles, the content of the aluminum oxide particles based on a total amount thereof may be the balance obtained by subtracting the content of the first rare earth aluminate fluorescent material particles from the total amount. The raw material mixture may have a content of the first rare earth aluminate fluorescent material particles in a range of 5% by mass or more and 40% by mass or less, and a content of the aluminum oxide particles in a range of 60% by mass or more and 95% by mass or less, based on the total amount thereof. The content of the first rare earth aluminate fluorescent material particles in the raw material mixture may be in a range of 6% by mass or more and 38% by mass or less, and may be in a range of 7% by mass or more and 35% by mass or less, based on the total amount thereof. The content of the aluminum oxide particles in the raw material mixture may be in a range of 62% by mass or more and 94% by mass or less, and may be in a range of 65% by mass or less and 93% by mass or less, based on the total amount thereof.

In the case where the raw material mixture contains the first rare earth aluminate fluorescent material particles, the aluminum oxide particles, and the second rare earth oxide particles, it is preferred that the content of the first rare earth aluminate fluorescent material particles is in a range of 5% by mass or more and 40% by mass or less, the content of the aluminum oxide particles is in a range of 57% by mass or more and 94.99% by mass or less, and the content of the second rare earth oxide particles is in a range of 0.01% by mass or more and 3% by mass or less, based on the total amount thereof. In the case where the raw material mixture contains the second rare earth oxide particles in a content in the aforementioned range, the second rare earth oxide particles and the aluminum oxide particles can be reacted with each other in calcining the molded body described later, and the crystal growth of the aluminum oxide particles can be suppressed. By suppressing the crystal growth of the aluminum oxide particles, the ceramic complex including the second crystal phase containing aluminum oxide having a small crystal diameter, a narrow particle diameter distribution of the crystal diameter, and a uniform crystal diameter can be obtained. The resulting ceramic complex has a small second crystal diameter of the second crystal phase constituting the matrix, a narrow particle diameter distribution of the second crystal diameter, and a uniform second crystal diameter, and therefore the wavelength of light incident on the ceramic complex is converted with the first rare earth aluminate fluorescent material contained in the first crystal phase, and simultaneously the incident light is scattered with the second crystal phase, resulting in light with suppressed fluctuation in color tone emitted from the ceramic complex.

In the case where the raw material mixture contains the first rare earth aluminate fluorescent material particles, the aluminum oxide particles, and the second rare earth oxide particles, the total amount of the raw material mixture may be the total amount of the first rare earth aluminate fluorescent material particles, the aluminum oxide particles, and the second rare earth oxide particles. The content of the aluminum oxide particles in the raw material mixture may be the balance obtained by subtracting the content of the first rare earth aluminate fluorescent material particles and the second rare earth oxide particles from the total amount. The raw material mixture may have a content of the first rare earth aluminate fluorescent material particles in a range of 6% by mass or more and 38% by mass or less, a content of the second rare earth oxide particles in a range of 0.05% by mass or more and 2.5% by mass or less, and a content of the aluminum oxide particles in a range of 59.5% by mass or more and 93.95% by mass or less, based on the total amount thereof. The raw material mixture may have a content of the first rare earth aluminate fluorescent material particles in a range of 7% by mass or more and 35% by mass or less, a content of the second rare earth oxide particles in a range of 0.1% by mass or more and 2% by mass or less, and a content of the aluminum oxide particles in a range of 63% by mass or more and 92.9% by mass or less, based on the total amount thereof.

Figure 2A:
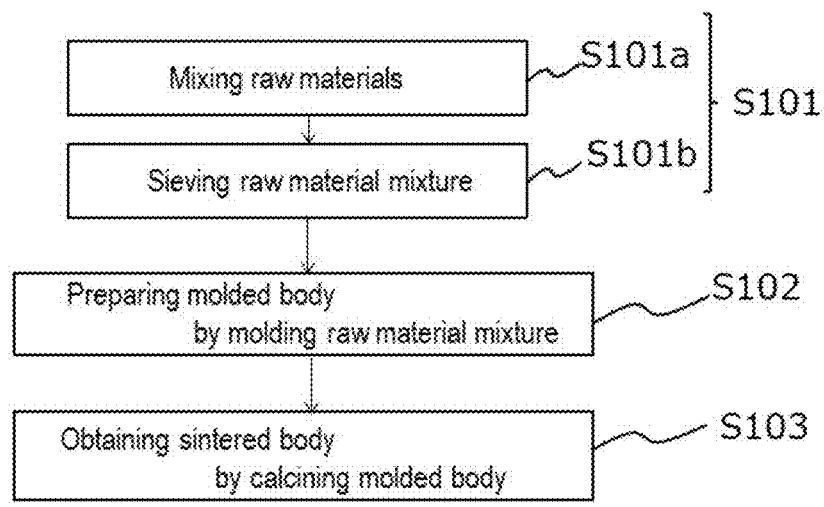
FIG. 2A is a flowchart describing an exemplary method for producing a ceramic complex according to a second embodiment of the present disclosure.
Figure 2B:
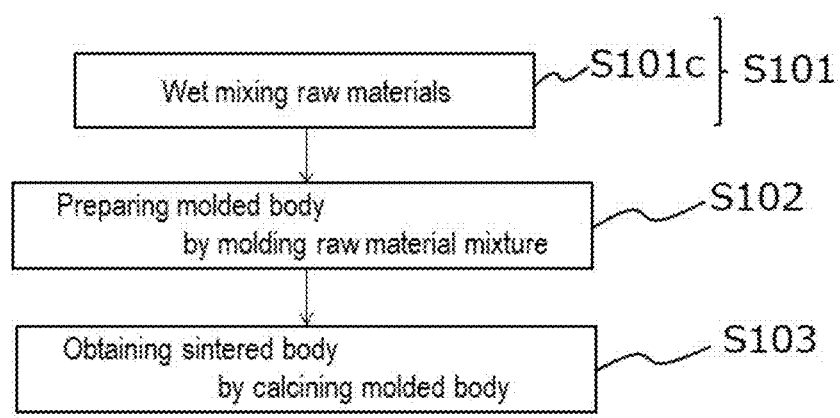
FIG. 2B is a flowchart describing an exemplary method for producing a ceramic complex according to a third embodiment of the present disclosure.
Figure 2C:
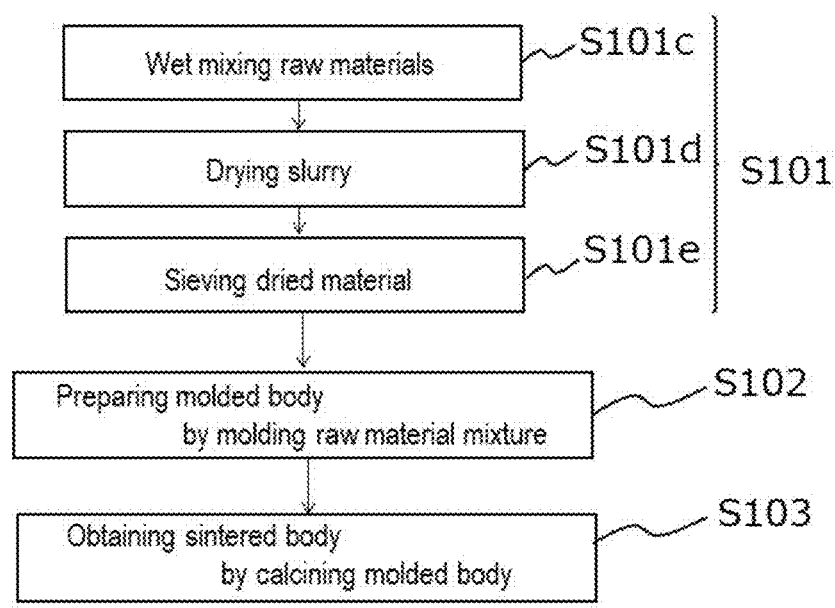
FIG. 2C is a flowchart describing an exemplary method for producing a ceramic complex according to a fourth embodiment of the present disclosure.

FIG. 2A is a flowchart showing the second embodiment of the method for producing a ceramic complex, FIG. 2B is a flowchart showing the third embodiment of the method for producing a ceramic complex, and FIG. 2C is a flowchart showing the fourth embodiment of the method for producing a ceramic complex. As shown in FIG. 2A, the method for producing a ceramic complex may include a step of mixing raw materials S101a and a step of sieving the raw material mixture in the step S101 of preparing the raw material mixture. As shown in FIG. 2B, the method for producing a ceramic complex may include a step of wet mixing raw materials S101c in the step S101 of preparing the raw material mixture. As shown in FIG. 2C, the method for producing a ceramic complex may include a step of wet mixing raw materials S101c, and after the step of wet mixing S101c, a step of drying slurry S101d and a step of sieving dried material S101e, in the step S101 of preparing the raw material mixture.

Step of preparing Raw Material Mixture

Mixing of Raw Materials

In the step of preparing the raw material mixture, the raw materials, i.e., the first rare earth aluminate fluorescent material particles, the aluminum oxide particles, and optionally the second rare earth oxide particles, are mixed with a mixer by a wet method or a dry method. The mixer used may be a ball mill, a vibration mill, a roll mill, a jet mill, which are ordinarily used industrially.

Sieving of Raw Material Mixture

In the step of preparing the raw material mixture, the raw material mixture is preferably sieved with a sieve having an aperture of 160 μm or less to prepare a sieved raw material mixture. The sieve used for sieving preferably has an aperture of 160 μm or less, and the aperture of the sieve may be 150 μm or less, may be 140 μm or less, may be 130 μm or less, may be 125 μm or less, and may be 110 μm or less. A sieve having an aperture of 100 μm or more may be used for performing the sieving within a short period of time. The sieve may be a nylon #110 mesh having an aperture of 160 μm and a thread diameter of 71 μm. The sieve of this type used may be, for example, N-No. 110S (manufactured by NBC Meshtec, Inc.). By sieving the raw material with a sieve having an aperture of 160 μm or less to prepare the sieved raw material mixture, the aggregation of aluminum oxide contained in the raw material mixture can be suppressed, and the crystal growth of the aluminum oxide particles can be suppressed in calcining the molded article described later. By suppressing the crystal growth of the aluminum oxide particles, the second crystal diameter is decreased, and the particle diameter distribution assuming that the second crystal phase is constituted by particles becomes narrow, resulting in the ceramic complex including the second crystal phase containing aluminum oxide having a uniform diameter. The sieving operation of the raw material mixture is preferably performed at least once, and may be performed twice or more.

Wet Mixing

In the step of preparing the raw material mixture, the raw materials, i.e., the first rare earth aluminate fluorescent material particles, the aluminum oxide particles, and optionally the second rare earth oxide particles, are preferably wet-mixed after adding a solvent thereto. Examples of the solvent used in the wet mixing include deionized water and ethanol. By wet-mixing the first rare earth aluminate fluorescent material particles, the aluminum oxide particles, and optionally the second rare earth oxide particles, the aluminum oxide particles are dispersed in the solvent to suppress the aggregation of the aluminum oxide particles, and the crystal growth of the aluminum oxide particles can be suppressed in calcining the molded body described later. By suppressing the crystal growth of the aluminum oxide particles, the second crystal diameter is decreased, and the particle diameter distribution assuming that the second crystal phase is constituted by particles becomes narrow, resulting in the ceramic complex including the second crystal phase containing aluminum oxide having a uniform diameter. The period of time of the wet mixing may vary depending on the solid dispersion medium and the solvent used, and is preferably 30 minutes or more, more preferably 60 minutes or more, and further preferably 90 minutes or more, and is preferably 420 minutes or less, from the standpoint of the enhancement of the productivity.

Drying and Sieving of Dried Material

In the step of preparing the raw material mixture, it is preferred that the slurry obtained through the wet mixing is dried, and the resulting dried material is sieved with a sieve having an aperture of 160 μm or less to prepare the sieved raw material mixture. The sieve used for sieving the dried material may be the same as the sieve used for sieving the raw material mixture. The sieving operation of the dried material is preferably performed at least once, and may be performed twice or more. The drying time of the slurry may be 15 hours or more, may be 20 hours or more, and may be 30 hours or less. The drying temperature may be a temperature at which the solvent is evaporated, and for example, may be in a range of 80° C. or higher and 105° C. or lower, and may be in a range of 90° C. or higher and 100° C. or lower.

Step of preparing Molded Body

In the step of preparing a molded body, the raw material mixture is molded to prepare a molded body. The method for forming the molded body used may be a known method, such as a press molding method. Examples of the press molding method include metal mold pressing and cold isostatic pressing (CIP), the terminology of which is defined in JIS Z2500:2000, No. 2109. In alternative, the raw material mixture may be molded by uniaxial pressing to obtain the molded body. The method for providing the molded body by molding the raw material mixture may include two methods for conditioning the shape of the molded body, and for example, CIP may be performed after performing metal mold pressing, or CIP may be performed after uniaxially pressing by the roller bench method. CIP is preferably performed by pressing the molded body by the cold isostatic pressing method using water as a medium.

The pressure in metal mold pressing or the pressure in molding by uniaxial pressing is preferably 5 MPa or more and 50 MPa or less, and more preferably 5 MPa or more and 30 MPa or less. In the case where the pressure in metal mold pressing or the pressure in molding by uniaxial pressing is in the range, the molded body can be conditioned to the target shape.

The pressure in CIP is preferably 50 MPa or more and 200 MPa or less, and more preferably 50 MPa or more and 180 MPa or less. In the case where the pressure in CIP is in a range of 50 MPa or more and 200 MPa or less, the molded body capable of providing the ceramic complex having a relative density of 95% or more through calcining at a temperature of 1,550° C. or higher and 1,800° C. or lower described later can be formed.

Step of Obtaining Sintered Body (Primary Calcining Step)

In the step of obtaining a sintered body, the molded body is calcined at a temperature in a range of 1,550° C. or higher and 1,800° C. or lower to obtain a sintered body. The molded body may be primarily calcined at a temperature in a range of 1,550° C. or higher and 1,800° C. or lower to obtain a first sintered body. The temperature in calcining is preferably in a range of 1,600° C. or higher and 1,750° C. or lower, and more preferably in a range of 1,650° C. or higher and 1,700° C. or lower. In the case where the temperature for calcining the molded body is in a range of 1,550° C. or higher and 1,800° C. or lower, the ceramic complex including the first crystal phase containing the first rare earth aluminate fluorescent material, the second crystal phase containing aluminum oxide, and optionally the third crystal phase containing the second rare earth aluminate can be obtained without melting the first rare earth aluminate fluorescent material.

The molded body may be calcined in an oxygen-containing atmosphere. The content of oxygen in the atmosphere is preferably 5% by volume or more, more preferably 10% by volume or more, and further preferably 15% by volume or more. The molded body may be calcined in the air atmosphere (oxygen content: 20% by volume or more). The atmosphere for calcining may be the atmospheric pressure (0.101 MPa).

It is preferred that the method for producing a ceramic complex includes, in the step of obtaining the sintered body, primarily calcining the molded body at a temperature in a range of 1,550° C. or higher and 1,800° C. or lower to obtain a first sintered body, and secondarily calcining the first sintered body at a temperature in a range of 1,500° C. or higher and 1,800° C. or lower by hot isostatic pressing (HIP) to obtain a second sintered body, so as to obtain the ceramic complex having a second crystal diameter of the second crystal phase included in the second sintered body of 12 μm or less measured by the aforementioned measurement condition.

Figure 3:
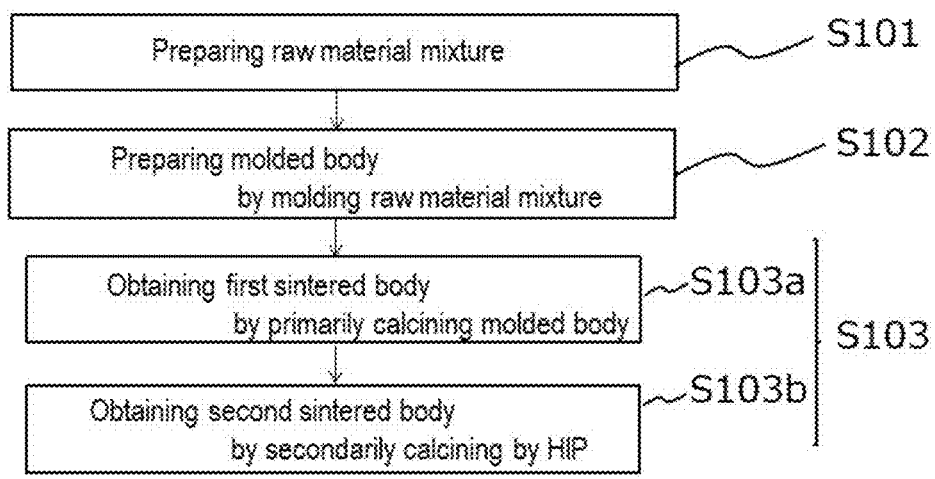
FIG. 3 is a flowchart describing an exemplary method for producing a ceramic complex according to a fifth embodiment of the present disclosure.

FIG. 3 is a flowchart showing the fifth embodiment of the method for producing a ceramic complex. As shown in FIG. 3, the method for producing a ceramic complex may include a step of primarily calcining the molded body to obtain a first sintered body S103a, and a step of secondarily calcining the first sintered body by HIP to obtain a second sintered body S103b, in the step of obtaining the sintered body.

Secondary Calcining Step

In the secondary calcining step, the first sintered body is secondarily calcined at a temperature in a range of 1,500° C. or higher and 1,800° C. or lower by hot isostatic pressing (HIP) to obtain a second sintered body.

The secondary calcining step is preferably performed at a temperature in a range of 1,500° C. or higher and 1,800° C. or lower by hot isostatic pressing (HIP), the terminology of which is defined in JIS Z2500:2000, No. 2112. By performing the secondary calcining step, the ceramic complex having a higher relative density can be obtained. The temperature of the secondary calcining is more preferably in a range of 1,550° C. or higher and 1,800° C. or lower, further preferably in a range of 1,600° C. or higher and 1,750° C. or lower, and particularly preferably in a range of 1,650° C. or higher and 1,700° C. or lower. The secondary calcining may be performed in an argon atmosphere or a nitrogen atmosphere.

The pressure in HIP in the secondary calcining is preferably in a range of 50 MPa or more and 300 MPa or less, and more preferably in a range of 80 MPa or more and 200 MPa or less. In the case where the pressure in HIP is in a range of 50 MPa or more and 300 MPa or less, the entire second sintered body can have a uniform high density without damaging the crystal structure of the first crystal phase containing the first rare earth aluminate fluorescent material.

The secondary calcining by HIP may be performed, for example, for a period of time of 0.5 hour or more and 20 hours or less, and for achieving a uniform high density of the entire second sintered body, is preferably performed for a period of time of 1 hour or more and 10 hours or less.

Figure 4:
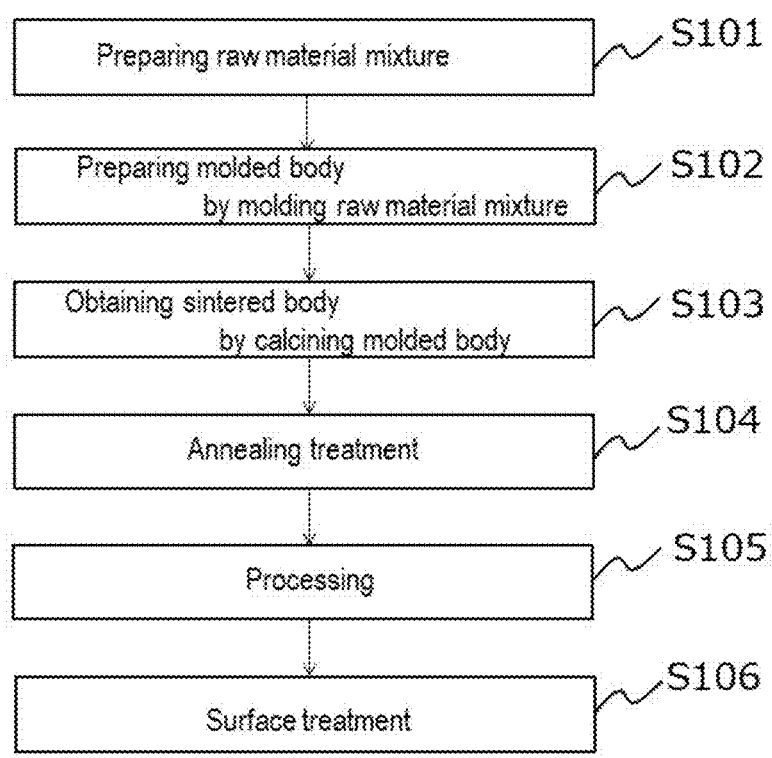
FIG. 4 is a flowchart describing an exemplary method for producing a ceramic complex according to a six embodiment of the present disclosure.

The method for producing a ceramic complex may include, after the step of providing the sintered body, at least one step of a annealing treatment step, a processing step, and a surface treatment step, may include two steps or more thereof, and may include all the three steps. FIG. 4 is a flowchart showing the sixth embodiment of the method for producing a ceramic complex. As shown in FIG. 4, the method for producing a ceramic complex may include a step S104 of an annealing treatment, optionally after the step S103 of obtaining the sintered body. The method for producing a ceramic complex may include a step S105 of processing the obtained sintered body, the first sintered body, or the second sintered body by cutting into the target diameter or thickness, and may further include a step S106 of a surface treatment optionally, after the step S103 of obtaining the sintered body.

Annealing Treatment

The resulting sintered body, first sintered body, or second sintered body may be subjected to an annealing treatment in a reducing atmosphere. By subjecting the resulting sintered body to an annealing treatment in a reducing atmosphere, the oxidized activating element contained in the first crystal phase containing the first rare earth aluminate fluorescent material can be reduced to suppress the decrease of the wavelength conversion efficiency and the decrease of the luminance due to the oxidation of the activating element as the luminescent center. The reducing atmosphere may be an atmosphere containing at least one kind of a rare gas selected from the group consisting of helium, neon, and argon, or nitrogen gas, and hydrogen gas or a carbon monoxide gas, and it is more preferred that the atmosphere contains at least argon gas or nitrogen gas, and hydrogen gas or carbon monoxide gas. The annealing treatment may be applied to the sintered body or the first sintered body, may be applied to the second sintered body, and may be applied to any one of the first sintered body and the second sintered body.

The temperature of the annealing treatment may be a temperature lower than the calcining temperature, and is preferably in a range of 1,000° C. or higher and 1,500° C. or lower. The temperature of the annealing treatment is more preferably in a range of 1,000° C. or higher and 1,400° C. or lower, and further preferably in a range of 1,100° C. or higher and 1,350° C. or lower. In the case where the temperature of the annealing treatment is a temperature lower than the calcining temperature, the primary calcining temperature, or the secondary calcining temperature, and is in a range of 1,000° C. or higher and 1,500° C. or lower, the oxidized activating element contained in the first crystal phase containing the first rare earth aluminate fluorescent material in the ceramic complex can be reduced to suppress the decrease of the wavelength conversion efficiency and the decrease of the luminance.

Processing Step

The resulting sintered body may be processed by cutting into a target diameter or thickness. The method for cutting may be a known method, and examples thereof include a method of cutting by at least one method selected from blade dicing, laser dicing, and wire saw dicing. Among these, wire saw dicing is preferred from the standpoint of the reduction of unevenness on the cut surface.

Surface Treatment Step

A surface treatment step described below may be further included. The surface treatment step is facing the surface of the cut body obtained by cutting the resulting sintered body or second sintered body. The surface treatment step not only can condition the surface of the ceramic complex to the optimum state for the enhancement of the light emission characteristics of the ceramic complex, but also can regulate the ceramic complex to the target shape, diameter or thickness by the surface treatment step alone or by the combination with the processing step described above. The surface treatment step may be performed before the processing step of cutting the sintered body or the second sintered body to the target diameter or thickness, or may be performed after the processing step. Examples of the method of the surface treatment include at least one method selected from a sand blasting method, a mechanical grinding method, a dicing method, and a chemical etching method.

The resulting ceramic complex may include the third crystal phase containing the second rare earth aluminate having a content of an element capable of functioning as an activator of 200 ppm by mass or less. The second rare earth oxide particles contained in the raw material mixture are reacted with the aluminum oxide particles to suppress the crystal growth of the aluminum oxide particles, and form the third crystal phase containing the second rare earth aluminate. The third crystal phase in the ceramic complex contains the second rare earth aluminate formed through reaction with the aluminum oxide particles by calcining at a temperature in a range of 1,550° C. or higher and 1,800° C. or lower, and therefore the third crystal phase contains substantially no element capable of functioning as an activator and has a content of an element capable of functioning as an activator of 200 ppm by mass or less. In the case where the activating element of the first rare earth aluminate fluorescent material is cerium (Ce), the content of cerium (Ce) of the third crystal phase containing the second rare earth aluminate is 200 ppm by mass or less. The content of the element capable of functioning as an activator in the third crystal phase containing the second rare earth aluminate can be obtained by measuring a cross section of the third crystal phase containing the second rare earth aluminate in the ceramic complex for the content of the element capable of functioning as an activator, such as cerium, in the third crystal phase by energy dispersive X-ray spectroscopy (EDX). The content of the element capable of functioning as an activator in the third crystal phase containing the second rare earth aluminate in the ceramic complex is 200 ppm by mass or less, may be 150 ppm by mass or less, may be 100 ppm by mass or less, may be the measurement limit of EDX or less, may be 0 ppm by mass, may be 0.1 ppm by mass or more, and may be 1 ppm by mass or more.

The second rare earth aluminate contained in the third crystal phase preferably has a composition represented by the formula (II) described above.

Light Emitting Device

The ceramic complex can be used as a member constituting a wavelength conversion member of a light emitting device by combining with a light source. One example of a light emitting device using the ceramic complex will be described below.

The light emitting device includes the wavelength conversion member including the ceramic complex and an excitation light source.

Figure 5A:
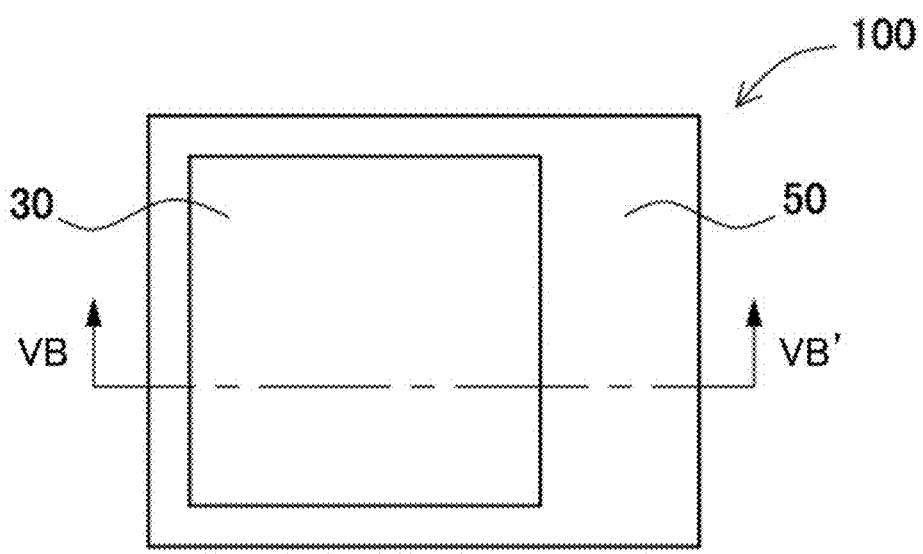
FIG. 5A is a schematic plane view of an exemplary light emitting device according to an embodiment of the present disclosure.
Figure 5B:
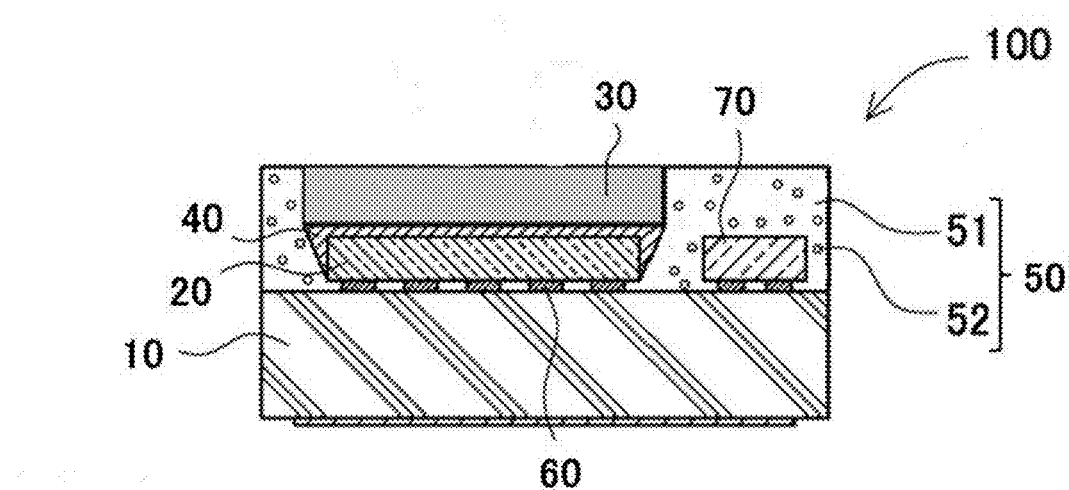
FIG. 5B is a schematic cross-sectional view of the light emitting device shown in FIG. 5A on line VB-VB'.

FIG. 5A is a schematic plane view of a light emitting device 100, and FIG. 5B is a schematic cross sectional view of the light emitting device 100 shown in FIG. 5A on line VB-VB'. The light emitting device 100 includes a light emitting element 20 formed of LED or LD, and a wavelength conversion member 30 formed of the ceramic complex emitting light through excitation with light from the light emitting element 20. The light emitting element 20 is flip-chip mounted on a mounting board 10 via bumps as electroconductive members 60. The light emitting element 20 is an excitation light source of the light emitting device 100, and the wavelength conversion member 30 is bonded to the light emitting surface of the light emitting element 20. The light emitting element 20 and the wavelength conversion member 30 may be bonded via an adhesive layer 40. The light emitting element 20 and the wavelength conversion member 30 are covered on the side surfaces thereof with a covering member 50 reflecting light. The light emitting element 20 receives electric power from outside of the light emitting device 100 via wiring and the electroconductive members 60 formed on the mounting board 10, and makes the light emitting device 100 possible to emit light. The light emitting device 100 may include a semiconductor element 70, such as a protective element for preventing the light emitting element 20 from being destroyed by an excessive voltage applied thereto. The covering member 50 may be provided, for example, to cover the semiconductor element 70. The covering member 50 may contain a resin 51 and at least one kind of an additive 52 selected from the group consisting of a colorant, a fluorescent material, and a filler. The members used in the light emitting device will be described below. For the details, for example, the disclosure of Japanese Unexamined Patent Publication No. 2014-112635 may be referred to.

Light Emitting Element

The light emitting element may be, for example, a semiconductor light emitting element using a nitride semiconductor, and an LED chip or an LD chip may be used therefor.

The light emitting element preferably has a light emission peak wavelength in a range of 380 nm or more and 500 nm or less, more preferably has a light emission peak wavelength in a range of 390 nm or more and 495 nm or less, further preferably has a light emission peak wavelength in a range of 400 nm or more and 490 nm or less, and particularly preferably has a light emission peak wavelength in a range of 420 nm or more and 490 nm or less. The light emitting element has a p-electrode and an n-electrode. The p-electrode and the n-electrode of the light emitting element may be provided on the same side of the light emitting element, or may be provided on different sides thereof. The light emitting element may be flip-chip mounted.

Wavelength Conversion Member

The ceramic complex may be used as the wavelength conversion member. The thickness of the ceramic complex used as the wavelength conversion member may be in a range of 50 μm or more and 500 μm or less, may be in a range of 60 μm or more and 450 μm or less, and may be in a range of 70 μm or more and 400 μm or less. The size of the ceramic complex used as the wavelength conversion member may be such a size that covers the entire light extraction surface of the light emitting element. An adhesive layer may be provided between the light emitting element and the wavelength conversion member, and the adhesive layer may fix the light emitting element and the wavelength conversion member. The wavelength conversion member may have, in addition to the ceramic complex, another member, such as a translucent member.

The mounting board of the light emitting device is preferably an insulating material that is difficult to transmit the light from the light emitting element and the external light. Examples of the material of the mounting board include ceramics, such as aluminum oxide and aluminum nitride, and a resin, such as a phenol resin, an epoxy resin, a polyimide resin, a bismaleimide-triazine resin (BT resin), and a polyphthalamide (PPA) resin. Ceramics are preferred as the mounting board due to the high heat resistance thereof.

In the case where the adhesive layer is provided between the light emitting element and the wavelength conversion member, the adhesive constituting the adhesive layer is preferably formed of a material capable optically linking the light emitting element and the wavelength conversion member. The material constituting the adhesive layer is preferably at least one kind of a resin selected from the group consisting of an epoxy resin, a silicone resin, a phenol resin, and a polyimide resin.

Examples of the semiconductor element provided depending on necessity in the light emitting device include a transistor for controlling the light emitting element, and a protective element for suppressing destruction and performance deterioration of the light emitting element due to application of an excessive voltage. Examples of the protective element include a Zener diode and a capacitor.

The material used as the conversion member is preferably an insulating material. Specific examples thereof include a phenol resin, an epoxy resin, a bismaleimide-triazine resin (BT resin), a polyphthalamide (PPA) resin, and a silicone resin. The conversion member may contain at least one kind of an additive selected from the group consisting of a colorant, a fluorescent material, and a filler, depending on necessity.

The electroconductive member used may be a bump, and the material of the bump may be Au or an alloy thereof, or other electroconductive materials, such as eutectic solder (Au—Sn), Pb—Sn, and lead-free solder.

Method for Producing Light Emitting Device

One example of the method for producing the light emitting device will be described. For the details, for example, the disclosure of Japanese Unexamined Patent Publication No. 2014-112635 or Japanese Unexamined Patent Publication No. 2017-117912 may be referred to. The method for producing the light emitting device preferably includes a step of disposing a light emitting element, depending on necessity a step of disposing a semiconductor element, a step of forming a wavelength conversion member including the ceramic complex, a step of adhering the light emitting element and the wavelength conversion member, and a step of forming a covering member.

In the step of disposing a light emitting element, the light emitting element is disposed and mounted on the mounting board. The light emitting element and the semiconductor element are, for example, flip-chip mounted on the mounting board.

In the step of adhering the light emitting element and the wavelength conversion member, the wavelength conversion member is bonded on the light emitting element with the adhesive layer in such a manner that the wavelength conversion member faces the light emitting surface of the light emitting element.

In the step of forming a covering member, the side surfaces of the light emitting element and the wavelength conversion member except for the light emitting surface are covered with a composition for the covering member, and the covering member is formed on the side surfaces of the light emitting element and the wavelength conversion member except for the light emitting surface. The covering member is to reflect light emitted from the light emitting element, and is formed to cover the side surface of the wavelength conversion member except for the light emitting surface, and to embed the semiconductor element.

The light emitting device 100 shown in FIGS. 5A and 5B can be produced in the aforementioned manner.

EXAMPLES

The present disclosure will be described more specifically with reference to examples below. The present disclosure is not limited to the examples.

Example 1

Step of Preparing Raw Material Mixture
First Rare Earth Aluminate Fluorescent Material Particles First rare earth aluminate fluorescent material particles having a composition of $(Y_{0.806}Gd_{0.16}Ce_{0.034})_3Al_5O_{12}$ containing Ce as an activating element and Y and Gd as the first rare earth element were prepared. The average particle diameter of the first rare earth aluminate fluorescent material particles by the FSSS method was 15 μm.

Aluminum Oxide Particles

Aluminum oxide ($Al_2O_3$) particles having a purity of aluminum oxide of 99% by mass were prepared as aluminum oxide particles. The average particle diameter of the aluminum oxide particles by the FSSS method was 0.6 μm.

Second Rare Earth Oxide Particles

Yttrium oxide ($Y_2O_3$) particles were prepared as the second rare earth oxide particles containing Y as the second rare earth element. The average particle diameter of the yttrium oxide particles by the FSSS method was 0.1 μm.

Preparation of Raw Material Mixture 11 g of the first rare earth aluminate fluorescent material particles, 88.9 g of the aluminum oxide particles, and 0.1 g of the yttrium oxide particles were weighed and mixed in a dry ball mill, from which the balls as the mixing medium were then removed to prepare a raw material mixture. The contents of the first rare earth aluminate fluorescent material particles, the aluminum oxide particles, and the yttrium oxide particles based on 100% by mass of the total amount of the raw material mixture containing these particles are shown in Table 1.

Step of Preparing Molded Body

The raw material mixture was charged in a metal mold, and molded into a molded body in a cylindrical shape having a diameter of 100 mm and a thickness of 12 mm by applying a pressure of 10 MPa (102 kgf/cm$^2$). The resulting molded body was placed in a packaging container, vacuum-packed therein, and then subjected to CIP at 176 MPa with a cold isostatic pressing machine (manufactured by Kobe Steel, Ltd. (KOBELCO)), so as to obtain a molded body.

Step of Obtaining Sintered Body
Primarily Calcining Step

The resulting molded body was primarily calcined at a temperature of 1,650° C. under the air atmosphere (0.101 MPa, oxygen concentration: 20% by volume) with a calcining furnace (manufactured by Marusho Denki Co., Ltd.), so as to obtain a first sintered body.

Secondary Calcining Step

The resulting first sintered body was secondarily calcined by HIP at a temperature of 1,650° C. under a pressure of 195 MPa for 2 hours in a nitrogen gas atmosphere (99.99% by volume or more) using nitrogen gas as the pressure medium with a hot isostatic pressing (HIP) machine (manufactured by Kobe Steel, Ltd. (KOBELCO)), so as to obtain a second sintered body. The second sintered body was cut into the target shape and diameter with a wire saw, and the cut surface was polished with a surface polisher, so as to obtain a ceramic complex of Example 1 in a plate shape having a thickness of 180 μm. The ceramic complex of Example 1 had formed therein the third crystal phase of the second rare earth aluminate represented by $Y_3Al_5O_{12}$ formed through reaction of the aluminum oxide particles and the yttrium oxide particles. The third crystal phase on the cross section of the ceramic complex was measured for the content of Ce in the third crystal phase with a wavelength dispersive X-ray spectroanalyzer EPMA (WDS) (JXA-8230, manufactured by JEOL, Ltd.), and the content of Ce was 100 ppm by mass or less.

Examples 2 and 3

Ceramic complexes of Examples 2 and 3 were obtained in the same manner as in Example 1 except that the contents of the aluminum oxide particles and the yttrium oxide particles contained in the raw material mixture were changed as shown in Table 1.

Example 4

The first rare earth aluminate fluorescent material particles used in Example 1 and the aluminum oxide particles used in Example 1 were used, and 11 g of the first rare earth aluminate fluorescent material particles and 89 g of the aluminum oxide particles were weighed and mixed in a dry ball mill, from which the balls as the mixing medium were then removed, and sieved with a nylon #110 mesh having an aperture of 160 μm and a thread diameter of 71 μm (N-No. 1105, manufactured by NBC Meshtec, Inc.), so as to prepare a sieved raw material mixture. The contents of the first rare earth aluminate fluorescent material particles and the aluminum oxide particles based on 100% by mass of the total amount of the raw material mixture containing these particles are shown in Table 1. A ceramic complex of Example 4 was obtained in the same manner as in Example 1 except that the raw material mixture thus prepared was used.

Example 5

The first rare earth aluminate fluorescent material particles used in Example 1 and the aluminum oxide particles used in Example 1 were used, 11 g of the first rare earth aluminate fluorescent material particles and 89 g of the aluminum oxide particles were weighed, 50 g of deionized water as a solvent was added to the total amount of the first rare earth aluminate fluorescent material particles and the aluminum oxide particles, and the materials were mixed in a wet ball mill, from which the balls as the mixing medium were then removed to obtain a slurry. The resulting slurry was dried at 100° C. for 24 hours to obtain a dried material. The resulting dried material was sieved with a nylon #110 mesh having an aperture of 160 μm and a thread diameter of 71 μm (N-No. 110S, manufactured by NBC Meshtec, Inc.), so as to prepare a sieved raw material mixture. The contents of the first rare earth aluminate fluorescent material particles and the aluminum oxide particles based on 100% by mass of the total amount of the raw material mixture containing these particles are shown in Table 1. A ceramic complex of Example 5 was obtained in the same manner as in Example 1 except that the raw material mixture thus prepared was used.

Comparative Example 1

A raw material mixture was obtained in the same manner as in Example 1 except that the first rare earth aluminate fluorescent material particles used in Example 1 and the aluminum oxide particles used in Example 1 were used, 11 g of the first rare earth aluminate fluorescent material particles and 89 g of the aluminum oxide particles were weighed, and a ceramic complex of Comparative Example 1 was obtained in the same manner as in Example 1 except that the raw material mixture thus prepared was used.

Measurement of Average Particle Diameter of Raw Materials

The first rare earth aluminate fluorescent material particles, the aluminum oxide particles, and the yttrium oxide particles as the second rare earth oxide particles were measured for the average particle diameter in the following manner.

With Fisher Sub-Sieve Sizer Model 95 (manufactured by Thermo Fisher Scientific, Inc.) under an environment at an ambient temperature of 25° C. and a relative humidity of 70%, 1 cm$^3$ of a raw material specimen was weighed from each of the particles and packed in a dedicated tubular vessel, to which dry air was then fed at a constant pressure, and the specific surface area was read from the differential pressure, from which the average particle diameter by the FSSS method was calculated. The results were as described above.

Measurement of Ceramic Complex

Contents of First Crystal Phase and Second Crystal Phase

The content (% by volume) of the first crystal phase and the content (% by volume) of the second crystal phase were obtained according to the expressions (1) to (5) above.

Measurement of Relative Density

The relative density of each of the ceramic complexes of Examples and Comparative Example were obtained according to the expressions (6) to (9) above. The calculation was performed under the assumption that the true density of the first rare earth aluminate fluorescent material ($(Y_{0.806}Gd_{0.16}Ce_{0.034})_3Al_5O_{12}$) was 4.67 g/cm$^3$, the true density of the aluminum oxide particles was 3.98 g/cm$^3$, and the true density of the second rare earth aluminate ($Y_3Al_5O_{12}$) in the ceramic complex was 4.60 g/cm$^3$.

SEM Image—Secondary Electron Image

An SEM image of a secondary electron image of the cross section (polished surface) of each of the ceramic complexes of Examples and Comparative Example was obtained with a scanning electron microscope (SEM) (SU3500, manufactured by Hitachi Hightechnologies Corporation).

Measurement of Crystal Diameter

The second crystal diameter of the second crystal phase containing aluminum oxide was measured from the SEM image of the polished surface of the cross section of each of ceramic complexes of Examples and Comparative Example under the following measurement condition.

Measurement Condition:

In the SEM image of the cross section of the ceramic complex obtained with a scanning electron microscope, the maximum width of the crystal phase delimited by the grain boundary on the cross section and the minimum width passing the center point of the maximum width are measured, the average of the maximum width and the minimum width is designated as a crystal diameter, and the arithmetic average value of the crystal diameters in a specific size area (arbitrary area) in the SEM images with the same magnification is designated as the average value of the crystal diameter.

An average value of the second crystal diameters of randomly selected 20 pieces of the second crystal phase was calculated. A particle diameter distribution curve of the second crystal diameter was prepared assuming that randomly selected 20 pieces of the second crystal phase are particles, and the QD value expressed by QD=$(D_{75}-D_{25})/(D_{75}+D_{25})$, wherein $D_{25}$ and $D_{75}$ represent values of the second crystal diameter at cumulative values from the small diameter side of the particle diameter distribution curve of the second crystal diameter of 25% and 75% respectively, was calculated.

Production of Light Emitting Device

The light emitting device 100 shown in FIGS. 5A and 5B was produced in the following manner using each of the resulting ceramic complexes of Examples and Comparative Example. The light emitting element 20 and the semiconductor element 70 were disposed on the mounting board 10. Specifically, the light emitting element 20 having a thickness of approximately 0.11 mm, a substantially square plane shape with an edge length of approximately 1.0 mm, and a dominant wavelength of 450 nm formed by accumulating nitride semiconductors on a sapphire substrate, and the semiconductor element 70 were disposed in a line in such a manner that the side of the sapphire substrate as the semiconductor growth substrate became the light emitting surface, and flip-chip mounted on a conductor pattern formed on the mounting board 10 with the electroconductive members 60 formed of Au.

A silicone resin as the adhesive 40 was then disposed on the light emitting element 20, and the wavelength conversion member 30 obtained by forming each of the ceramic complexes of Examples and Comparative Example into a plate shape was adhered to the upper surface of the sapphire substrate of the light emitting element 20.

The covering member 50 was disposed around the light emitting element 20, the wavelength conversion member 30, and the semiconductor element 70. The covering member 50 was disposed along the side surfaces of the light emitting element 20 and the wavelength conversion member 30, and simultaneously the semiconductor element 70 was completely embedded in the covering member 50. The resin 51 contained in the covering member 50 was a dimethylsilicone resin, and titanium oxide particles having an average particle diameter of 0.28 μm as the light reflecting material 52 was added thereto in an amount of 60% by mass based on the resin 51. The light emitting device 100 shown in FIGS. 5A and 5B was produced in the aforementioned process.

The light emitting devices using the ceramic complex of Examples and Comparative Example each were evaluated in the following manner. The results are shown in Table 1.

Chromaticity Coordinate (x, y) and Standard Deviation 40 light emitting devices were produced by using each of the ceramic complexes of Examples and Comparative Example, and measured for the chromaticity coordinate (x, y) in the chromaticity coordinate system of the CIE (Commission Internationale de l'Eclarirage) 1931 chromaticity diagram with an imaging colorimeter (ProMetric 18, manufactured by Radiant Vision Systems, LLC). The average value of the chromaticity coordinates (x,y) of the 40 light emitting devices using each of the ceramic complexes of Examples and Comparative Example was designated as the chromaticity coordinate (x,y) of each of the ceramic complexes of Examples and Comparative Example. The standard deviation (1σ) of the chromaticity coordinate (x, y) of the 40 light emitting devices using each of the ceramic complexes of Examples and Comparative Example was obtained as an index for evaluating the fluctuation in color tone. The results are shown in Table 1.

TABLE 1

| | Raw material mixture | | | Ceramic complex | | | | | | Light emitting device | | | |
|---|---|---|---|---|---|---|---|---|---|---|---|---|---|
| | First rare earth aluminate fluorescent material particles | Aluminum oxide particles | Second rare earth oxide particles | First crystal phase | Second crystal phase | Third crystal phase | Average value of second crystal diameter | Second crystal diameter QD value | Relative density | Chromaticity coordinate | | Standard deviation of chromaticity coordinate | |
| | (% by) | (% by mass) | (% by mass) | (% by volume) | (% by volume) | (% by volume) | (μm) | | (%) | x | y | xo | yo |
| Example 1 | 11.0 | 88.9 | 0.1 | 9.5 | 90.3 | 0.2 | 11.14 | 0.462 | 100.0 | 0.312 | 0.316 | 0.0018 | 0.0030 |
| Example 2 | 11.0 | 88.5 | 0.5 | 9.5 | 89.7 | 0.8 | 7.82 | 0.457 | 99.9 | 0.322 | 0.335 | 0.0016 | 0.0021 |
| Example 3 | 11.0 | 88.0 | 1.0 | 9.5 | 89.0 | 1.5 | 7.22 | 0.492 | 100.0 | 0.325 | 0.343 | 0.0019 | 0.0031 |
| Example 4 | 11.0 | 89.0 | 0 | 9.5 | 90.5 | 0 | 11.95 | 0.490 | 99.9 | 0.326 | 0.340 | 0.0016 | 0.0029 |
| Example 5 | 11.0 | 89.0 | 0 | 9.5 | 90.5 | 0 | 11.93 | 0.495 | 99.9 | 0.307 | 0.312 | 0.0018 | 0.0031 |
| Comparative Example | 11.0 | 89.0 | 0 | 9.5 | 90.5 | 0 | 13.50 | 0.664 | 100.0 | 0.316 | 0.322 | 0.0024 | 0.0043 |

The ceramic complexes according to Examples 1 to 5 each had an average value of the second crystal diameter of the second crystal phase measured under the aforementioned measurement condition of 12 μm or less and a QD value of 0.5 or less. The ceramic complexes according to Examples 1 to 5 each had an average value of the second crystal diameter of the second crystal phase that was smaller than the average value of the second crystal diameter of the second crystal phase of the ceramic complex according to Comparative Example 1, and had a narrow particle diameter distribution assuming that the second crystal phase was constituted by particles, and the diameter of the second crystal phase was uniform. The light emitting devices using the ceramic complexs according to Examples 1 to 5 each had a standard deviation (xσ, yσ) of the chromaticity coordinate (x, y) of emitted light that is smaller than the standard deviation (xσ, yσ) of the chromaticity coordinate (x, y) of light emitted from the light emitting device using the ceramic complex according to Comparative Example 1, and had suppressed fluctuation in color tone.

Figure 6A:
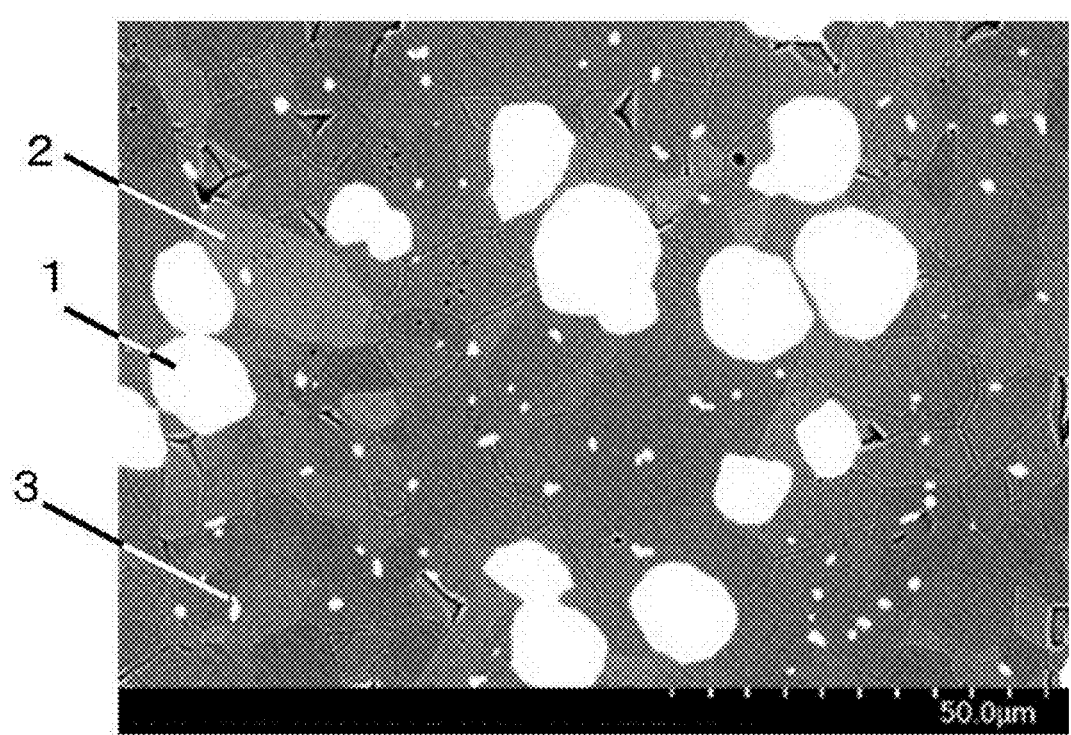
FIG. 6A is an exemplary scanning electron microscope (SEM) photograph of the secondary electron image of the cross section (polished surface) of the ceramic complex according to Example 3.
Figure 6B:
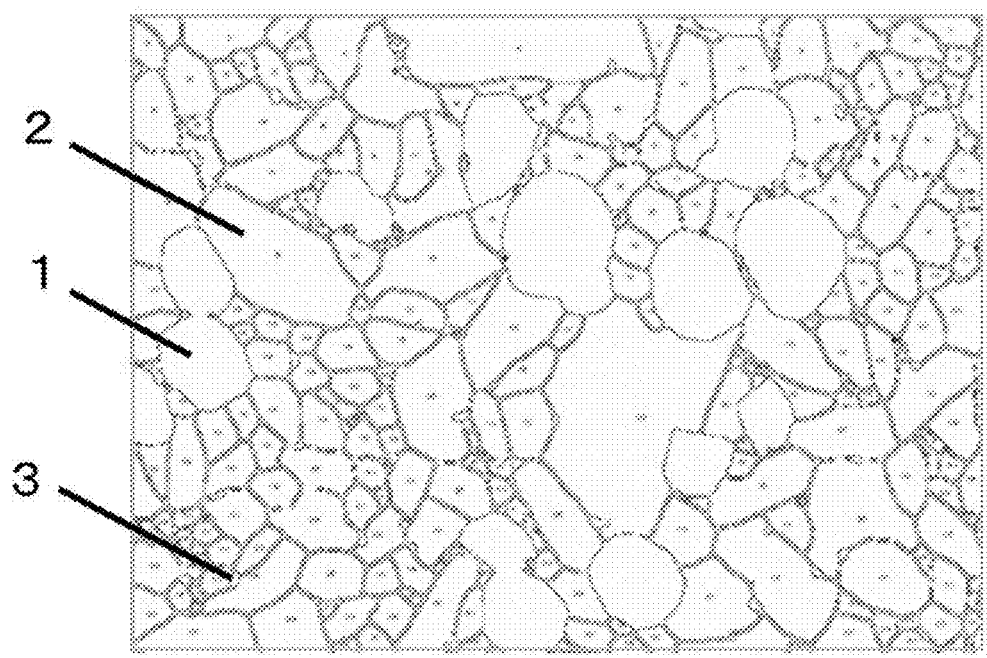
FIG. 6B is an exemplary illustration showing the grain boundary denoted by solid lines among the first crystal phase, the second crystal phase, and the third crystal phase of the SEM photograph in FIG. 6A.

FIG. 6A is the SEM image of the secondary electron image of the cross section (polished surface) of the ceramic complex according to Example 3, and FIG. 6B is an illustration showing the grain boundary denoted by solid lines among the first crystal phase, the second crystal phase, and the third crystal phase of the SEM image in FIG. 6A. The ceramic complex according to Example 3 contained a first crystal phase 1 containing the first rare earth aluminate fluorescent material, a second crystal phase 2 containing aluminum oxide, and a third crystal phase 3 containing the second rare earth aluminate formed through reaction of the aluminum oxide particles and the second rare earth oxide. It was confirmed that the average value of the second crystal diameter of the second crystal phase in the ceramic complex according to Example 3 was smaller than the average value of the second crystal diameter of the second crystal phase in the ceramic complex according to Comparative Example 1 described later.

Figure 7A:
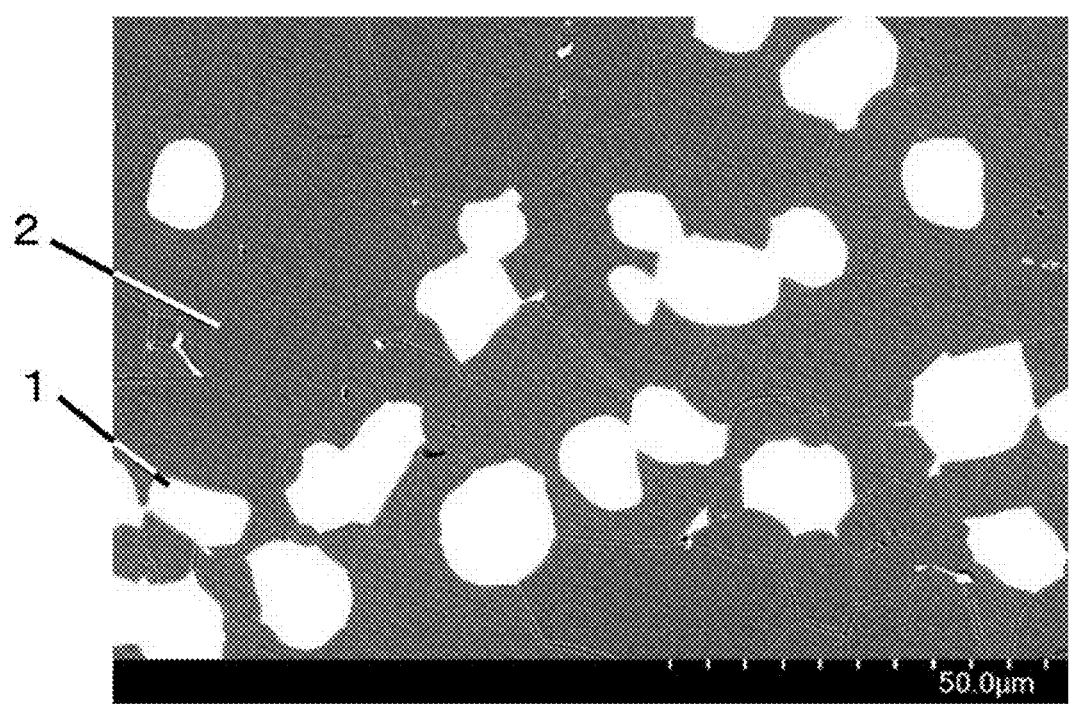
FIG. 7A is an exemplary SEM photograph of the secondary electron image of the cross section (polished surface) of the ceramic complex according to Example 4.
Figure 7B:
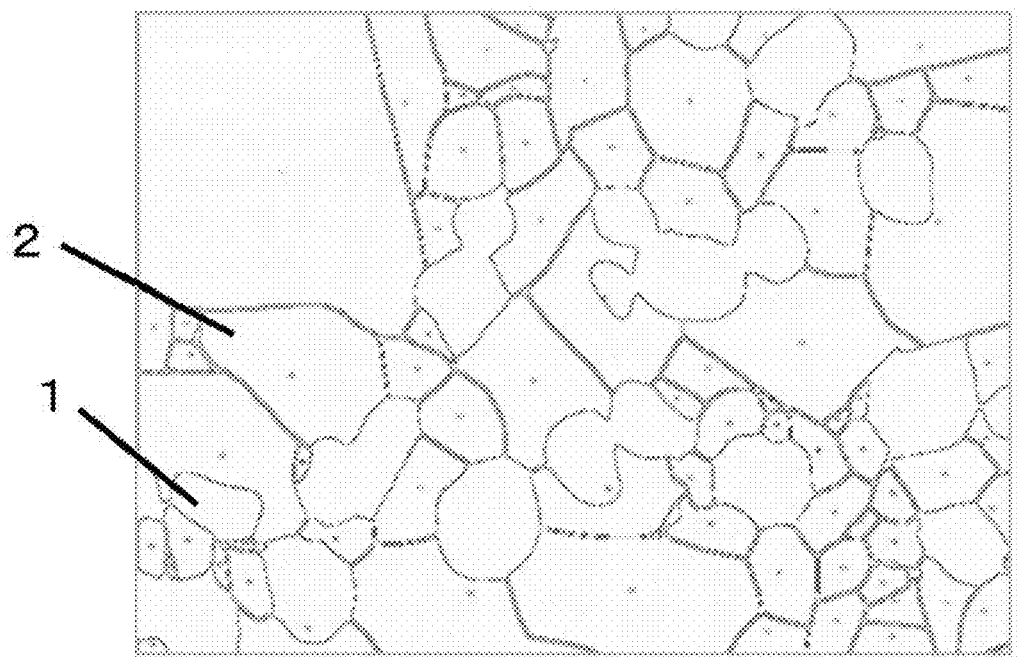
FIG. 7B is an exemplary illustration showing the grain boundary denoted solid lines between the first crystal phase and the second crystal phase of the SEM photograph in FIG. 7A.

FIG. 7A is the SEM image of the secondary electron image of the cross section (polished surface) of the ceramic complex according to Example 4, and FIG. 7B is an illustration showing the grain boundary denoted by solid lines between the first crystal phase and the second crystal phase of the SEM image in FIG. 7A. The ceramic complex according to Example 4 contained the first crystal phase 1 containing the first rare earth aluminate fluorescent material and the second crystal phase 2 containing aluminum oxide. The ceramic complex according to Example 4 contained no third crystal phase containing the second rare earth aluminate. In the ceramic complex according to Example 4, the raw material mixture was sieved with a sieve having an aperture of 160 μm or less, and thus it was confirmed that the average value of the second crystal diameter of the second crystal phase in the ceramic complex according to Example 4 was smaller than the average value of the second crystal diameter of the second crystal phase in the ceramic complex according to Comparative Example 1 described later.

Figure 8A:
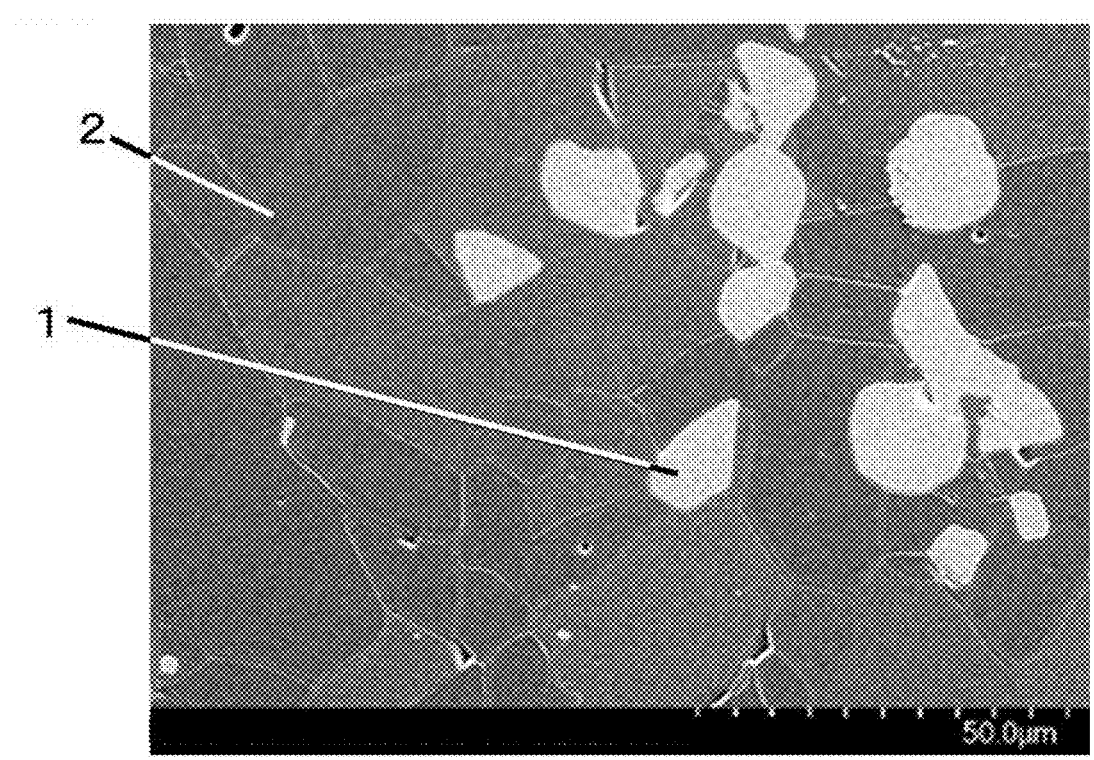
FIG. 8A is an exemplary SEM photograph of the secondary electron image of the cross section (polished surface) of the ceramic complex according to Comparative Example 1.
Figure 8B:
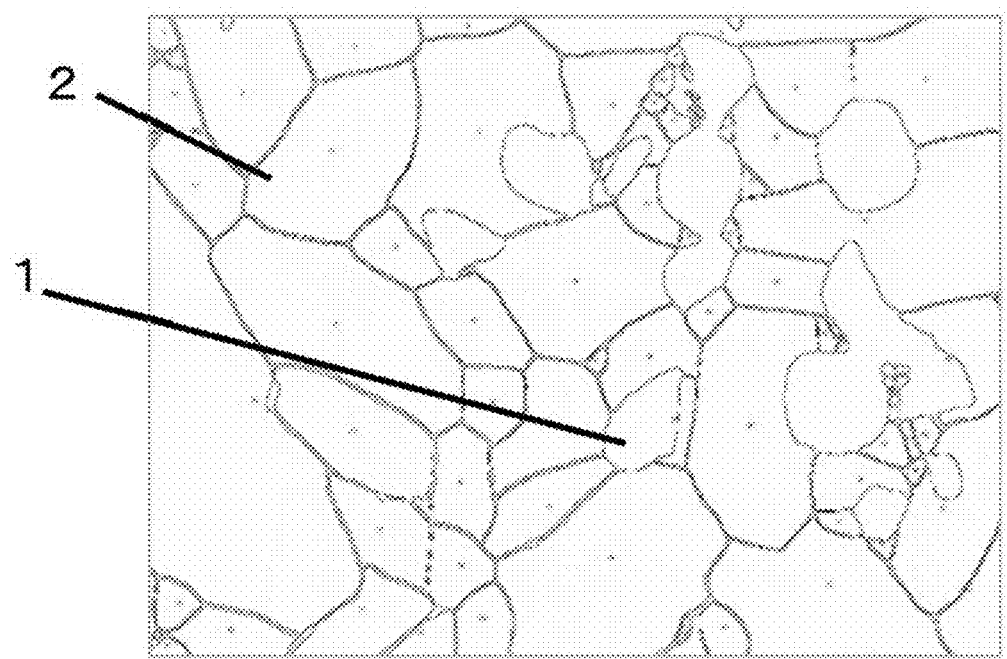
FIG. 8B is an exemplary illustration showing the grain boundary denoted solid lines between the first crystal phase and the second crystal phase of the SEM photograph in FIG. 8A.

FIG. 8A is the SEM image of the secondary electron image of the cross section (polished surface) of the ceramic complex according to Comparative Example 1, and FIG. 8B is an illustration showing the grain boundary denoted by solid lines between the first crystal phase and the second crystal phase of the SEM image in FIG. 8A. The ceramic complex according to Comparative Example 1 contained the first crystal phase 1 containing the first rare earth aluminate fluorescent material and the second crystal phase 2 containing aluminum oxide. The average value of the second crystal diameter of the second crystal phase in the ceramic complex according to Comparative Example 1 was larger than the average values of the second crystal diameters of the second crystal phases in the ceramic complexes according to Examples 3 and 4. The ceramic complex according to Comparative Example 1 used the same aluminum oxide particles as in Example 3, but failed to suppress the crystal growth of the aluminum oxide particles since the raw material mixture did not contain the second rare earth oxide. The ceramic complex according to Comparative Example 1 used the raw material mixture having the same composition and containing the same raw materials, but failed to suppress the crystal growth of the aluminum oxide particles since the raw material mixture was not sieved.

A ceramic complex obtained by a method for producing a ceramic complex according to one embodiment of the present disclosure can be combined with an excitation light source, such as LED and LD, and can be applied to a wavelength conversion member of light sources for in-vehicle use, general illumination use, a backlight of a liquid crystal display device, a projector.

The invention claimed is:

1. A light emitting device, comprising a wavelength conversion member containing a ceramic complex, and an excitation light source, wherein the ceramic complex comprises a first crystal phase that contains a first rare earth aluminate fluorescent material containing an activating element and a first rare earth element different from the activating element, a second crystal phase containing aluminum oxide and a third crystal phase containing a second rare earth aluminate containing a second rare earth element, wherein the ceramic complex has a content of the first crystal phase in a range of 5% by volume or more and 40% by volume or less, a content of the second crystal phase in a range of 57% by volume or more and 94.99% by volume or less and a content of the third crystal phase in a range of 0.01% by volume or more and 3% by volume or less based on a total amount of the ceramic complex, wherein the ceramic complex has an average value of a second crystal diameter of the second crystal phase measured under the following measurement condition of 12 μm or less, and wherein the ceramic complex has a QD value of 0.5 or less expressed by $QD=(D_{75}-D_{25})/(D_{75}+D_{25})$, wherein $D_{25}$ and $D_{75}$ represent values of the second crystal diameter at cumulative values from a small diameter side of a particle diameter distribution curve of the second crystal diameter of 25% and 75%, respectively, measurement condition:

in a scanning electron microscope (SEM) image of a cross section of the ceramic complex obtained with a scanning electron microscope, a maximum width of the crystal phase delimited by a grain boundary on the cross section and a minimum width passing a center point of the maximum width are measured, an average of the maximum width and the minimum width is designated as a crystal diameter, and an arithmetic average value of the crystal diameters in a specific size area in the SEM images with the same magnification is designated as the average value of the crystal diameter.

2. The light emitting device according to claim 1, wherein the first rare earth aluminate fluorescent material contains a first rare earth element $Ln^1$ that comprises at least one selected from the group consisting of Y, Lu, Gd, and Tb, Ce serving as the activating element, and Al, and optionally contains Ga, and has a composition of a first rare earth aluminate, in which a total molar ratio of the first rare earth element $Ln^1$ and Ce is 3; a molar ratio of Ce is a product of 3 and a parameter a in a range of more than 0 and 0.22 or less; a total molar ratio of Al and Ga is in a range of 4.5 or more and 5.5 or less; a molar ratio of Al is a product of 5 and a parameter c in a range of more than 0 and 1.1 or less; and a molar ratio of Ga is a product of 5 and a parameter b in a range of 0 or more and 0.4 or less.

3. The light emitting device according to claim 1, wherein the first rare earth aluminate fluorescent material has a composition represented by the following formula (I):

$$(Ln^1{}_{1-a}Ce_a)_3(Al_cGa_b)_5O_{12} \qquad (I)$$

wherein $Ln^1$ represents at least one selected from the group consisting of Y, Gd, Lu, and Tb, and the parameters a, b, and c satisfy $0<a\leq0.22$, $0\leq b\leq0.4$, $0<c\leq1.1$, and $0.9\leq b+c\leq1.1$.

4. The light emitting device according to claim 1, wherein the second rare earth aluminate contains a second rare earth element $Ln^2$ that comprises at least one selected from the group consisting of Y, Gd, Tb, and Lu.

5. The light emitting device according to claim 1, wherein the second rare earth aluminate has a composition represented by the following formula (II):

$$Ln^2{}_3Al_5O_{12} \qquad (II)$$

wherein $Ln^2$ represents at least one selected from the group consisting of Y, Gd, Tb and Lu.

6. The light emitting device according to claim 1, wherein the light emitting device comprises:

a light emitting element as the excitation light source, the wavelength conversion member bonded to a light emitting surface of the light emitting element, a mounting board disposed on the light emitting element, and a covering member covering side surfaces of the light emitting element and the wavelength conversion member.

\* \* \* \* \*